US011180353B2

(12) United States Patent
Shah et al.

(10) Patent No.: US 11,180,353 B2
(45) Date of Patent: *Nov. 23, 2021

(54) PALLET TRACKING DURING ENGAGEMENT AND DISENGAGEMENT

(71) Applicant: Boston Dynamics, Inc., Waltham, MA (US)

(72) Inventors: Hemal Shah, Campbell, CA (US); Ian Gulliver, Los Altos, CA (US)

(73) Assignee: Boston Dynamics, Inc., Waltham, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/835,397

(22) Filed: Mar. 31, 2020

(65) Prior Publication Data
US 2020/0223676 A1 Jul. 16, 2020

Related U.S. Application Data

(63) Continuation of application No. 15/853,437, filed on Dec. 22, 2017, now Pat. No. 10,640,347.

(51) Int. Cl.
*B66F 9/075* (2006.01)
*G06T 7/73* (2017.01)
(Continued)

(52) U.S. Cl.
CPC .............. *B66F 9/0755* (2013.01); *B66F 9/24* (2013.01); *G06Q 10/08* (2013.01); *G06T 7/73* (2017.01); *G06T 2207/10028* (2013.01)

(58) Field of Classification Search
CPC . B66F 9/0755; B66F 9/24; G06T 7/73; G06T 2207/10028; G06Q 10/08
(Continued)

(56) References Cited

U.S. PATENT DOCUMENTS

| 4,747,610 A | 5/1988 | Yingling et al. |
| 6,150,938 A | 11/2000 | Sower et al. |

(Continued)

FOREIGN PATENT DOCUMENTS

| EP | 2181944 | 7/2012 |
| EP | 2468678 | 3/2015 |

OTHER PUBLICATIONS

Varga et al., "Robust Pallet Detection for Automated Logistics Operations," International Conference on Computer Vision Theory and Applications, Jan. 2016, 9 Pages.

(Continued)

*Primary Examiner* — Michael Collins
(74) *Attorney, Agent, or Firm* — Wolf, Greenfield & Sacks, P.C.

(57) ABSTRACT

An example method may include receiving, from a sensor on a vehicle, an initial plurality of sensor data points representing a position of a face of a pallet. The vehicle may include tines configured to engage the pallet. A baseline geometric representation of the face of the pallet may be determined based on the initial plurality of sensor data points. The vehicle may be caused to reposition the tines relative to the pallet. A subsequent plurality of sensor data points representing the position of the face of the pallet after repositioning the tines may be received from the sensor. An updated geometric representation of the face of the pallet may be determined based on the subsequent sensor data points. It may be determined that the updated geometric representation deviates from the baseline geometric representation by more than a threshold value and, in response, motion of the vehicle may be adjusted.

20 Claims, 17 Drawing Sheets

(51) Int. Cl.
  *B66F 9/24*    (2006.01)
  *G06Q 10/08*   (2012.01)
(58) Field of Classification Search
  USPC .................................................. 700/213–230
  See application file for complete search history.

(56) References Cited

U.S. PATENT DOCUMENTS

| | | |
|---|---|---|
| 6,411,210 B1 | 6/2002 | Sower et al. |
| 6,952,488 B2 | 10/2005 | Kelly et al. |
| 8,718,372 B2 * | 5/2014 | Holeva ..................... B66F 9/24 |
| | | 382/181 |
| 8,849,007 B2 * | 9/2014 | Holeva ................... B66F 9/122 |
| | | 382/141 |
| 9,561,941 B1 | 2/2017 | Watts |
| 9,715,232 B1 | 7/2017 | Fischer et al. |
| 9,990,535 B2 * | 6/2018 | Phillips .............. G06K 9/00208 |
| 10,048,398 B2 * | 8/2018 | Rose ................... G05D 1/0259 |
| 10,102,629 B1 * | 10/2018 | Li .............................. G06T 7/75 |
| 10,328,578 B2 * | 6/2019 | Holz ....................... B66F 9/063 |
| 10,640,347 B2 * | 5/2020 | Shah ...................... G06Q 10/08 |
| 2014/0277691 A1 | 9/2014 | Jacobus et al. |
| 2017/0285644 A1 | 10/2017 | Ichinose et al. |
| 2018/0304468 A1 * | 10/2018 | Holz ......................... G06T 7/13 |

OTHER PUBLICATIONS

International Searching Authority, International Search Report and the Written Opinion of the International Searching Authority dated Dec. 11, 2018, issued in connection with International Application No. PCT/US2018/051306, filed on Sep. 17, 2018, 11 pages.

* cited by examiner

PALLET TRACKING DURING ENGAGEMENT AND DISENGAGEMENT

CROSS-REFERENCE TO RELATED APPLICATION

This application is a continuation of and claims priority to U.S. patent application Ser. No. 15/853,437, filed Dec. 22, 2017 and entitled "Pallet Tracking During Engagement and Disengagement," which is herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, which are flat transport structures that contain stacks of boxes or other objects thereon. Additionally, the warehouse may use machines or vehicles for lifting and moving goods or pallets of goods, such as cranes, forklifts, and pallet jacks. Human operators may be employed to operate machines, vehicles, and other equipment. In some cases, one or more of the machines or vehicles may be robotic devices guided by computer control systems.

SUMMARY

In an example embodiment, a control system may, based on data from a sensor, monitor a pose of a pallet while a vehicle engages or disengages from the pallet. Pallet engagement and disengagement may involve repositioning the vehicle's tines relative to the pallet to penetrate the pallet or remove the tines from the pallet, respectively. Before the vehicle repositions the tines, the control system may determine a baseline geometric representation of a face of the pallet, or a load disposed thereon, based on sensor data representing a position of the pallet within the environment. As the vehicle repositions the tines, the control system may determine updated geometric representations based on subsequent sensor data. The updated geometric representations may be compared to the baseline geometric representation to identify differences which, if large enough, could signal that the pallet is being pushed or dragged, rather than smoothly engaged or disengaged. If one of the updated geometric representations differs from the baseline geometric representation by more than a threshold extent, the control system may modify motion of the vehicle or the tines to avoid pushing or dragging the pallet. The geometric representations may include, depending on the sensor data, lines, planes, and centers of mass. In some embodiments, rather than determining updated geometric representations, inadvertent repositioning of the pallet may be identified by using an exclusion field which is proportionately resized as the vehicle moves toward or away from the pallet and which is expected to be unoccupied by sensor data points. Motion of the vehicle may be modified when more than a threshold extent of sensor data points are detected within the exclusion filed.

In a first embodiment, a method is provided that includes receiving, by a control system and from a sensor on a vehicle, an initial plurality of sensor data points representing a position of a face of a pallet within an environment. The vehicle includes one or more tines configured to engage the pallet. The method also includes determining, by the control system, a baseline geometric representation of the face of the pallet based on the initial plurality of sensor data points. The method additionally includes causing, by the control system, the vehicle to reposition the one or more tines relative to the pallet. The method yet additionally includes receiving, by the control system and from the sensor, a subsequent plurality of sensor data points representing the position of the face of the pallet after repositioning the one or more tines. The method further includes determining, by the control system, an updated geometric representation of the face of the pallet based on the subsequent sensor data points. The method yet further includes determining, by the control system, that the updated geometric representation deviates from the baseline geometric representation by more than a threshold value and, in response, adjusting, by the control system, motion of the vehicle.

In a second embodiment, a system is provided that includes a vehicle having one or more tines configured to engage pallets, a sensor on the vehicle, and a control system. The control system may be configured to receive, from the sensor, an initial plurality of sensor data points representing a position of a face of a pallet within an environment. The control system may also be configured to determine a baseline geometric representation of the face of the pallet based on the initial plurality of sensor data points. The control system may additionally be configured to cause the vehicle to reposition the one or more tines relative to the pallet. The control system yet additionally be configured to receive, from the sensor, a subsequent plurality of sensor data points representing the position of the face of the pallet after repositioning the one or more tines. The control system may be further configured to determine an updated geometric representation of the face of the pallet based on the subsequent sensor data points. The control system may yet further be configured to determine that the updated geometric representation deviates from the baseline geometric representation by more than a threshold value and, in response, adjust motion of the vehicle.

In a third embodiment, a non-transitory computer readable storage medium is provided having stored thereon instructions that, when executed by a computing device, cause the computing device to perform operations. The operations include receiving, from a sensor on a vehicle, an initial plurality of sensor data points representing a position of a face of a pallet within an environment. The vehicle includes one or more tines configured to engage the pallet. The operations also include determining a baseline geometric representation of the face of the pallet based on the initial plurality of sensor data points. The operations additionally include causing the vehicle to reposition the one or more tines relative to the pallet. The operations yet additionally include receiving, from the sensor, a subsequent plurality of sensor data points representing the position of the face of the pallet after repositioning the one or more tines. The operations further include determining an updated geometric representation of the face of the pallet based on the subsequent sensor data points. The operations yet further include determining that the updated geometric representation deviates from the baseline geometric representation by more than a threshold value and, in response, adjusting motion of the vehicle.

In a fourth embodiment, a system is provided that includes means for receiving, from a sensor on a vehicle, an initial plurality of sensor data points representing a position of a face of a pallet within an environment. The vehicle includes one or more tines configured to engage the pallet. The system also includes means for determining a baseline geometric representation of the face of the pallet based on the initial plurality of sensor data points. The system additionally includes means for causing the vehicle to reposition the one or more tines relative to the pallet. The system yet additionally includes means for receiving, from the sensor, a subsequent plurality of sensor data points representing the position of the face of the pallet after repositioning the one or more tines. The system further includes means for determining an updated geometric representation of the face of the pallet based on the subsequent sensor data points. The system yet further includes means for determining that the updated geometric representation deviates from the baseline geometric representation by more than a threshold value. The system still further includes means for adjusting motion of the vehicle in response to determining that the updated geometric representation deviates from the baseline geometric representation by more than the threshold value.

In a fifth embodiment, a method is provided that includes receiving, by a control system and from a sensor on a vehicle, an initial plurality of sensor data points representing a position of a face of a pallet within an environment. The vehicle has one or more tines configured to engage the pallet. The method also includes determining, by the control system, a baseline geometric representation of the face of the pallet based on the initial plurality of sensor data points. The method additionally includes determining, by the control system, an exclusion field between the vehicle and the baseline geometric representation based on a distance between the baseline geometric representation and the vehicle. The method yet additionally includes causing, by the control system, the vehicle to reposition the one or more tines relative to the pallet. The method further includes receiving, by the control system and from the sensor, a subsequent plurality of sensor data points representing the position of the face of a pallet after repositioning the one or more tines relative to the pallet. The method yet further includes determining, by the control system, that more than a threshold number of sensor data points of the subsequent plurality of sensor data points are within the exclusion field and, in response, adjusting, by the control system, motion of the vehicle.

In a sixth embodiment, a system is provided that includes a vehicle having one or more tines configured to engage pallets, a sensor on the vehicle, and a control system. The control system is configured to receive, from the sensor, an initial plurality of sensor data points representing a position of a face of a pallet within an environment. The control system is also configured to determine a baseline geometric representation of the face of the pallet based on the initial plurality of sensor data points. The control system is additionally configured to determine an exclusion field between the vehicle and the baseline geometric representation based on a distance between the baseline geometric representation and the vehicle. The control system is yet additionally configured to cause the vehicle to reposition the one or more tines relative to the pallet. The control system is further configured to receive, from the sensor, a subsequent plurality of sensor data points representing the position of the face of a pallet after repositioning the one or more tines relative to the pallet. The control system is yet further configured to determine that more than a threshold number of sensor data points of the subsequent plurality of sensor data points are within the exclusion field and, in response, adjust motion of the vehicle.

In a seventh embodiment, a non-transitory computer readable storage medium is provided having stored thereon instructions that, when executed by a computing device, cause the computing device to perform operations. The operations include receiving, from a sensor on a vehicle, an initial plurality of sensor data points representing a position of a face of a pallet within an environment. The vehicle has one or more tines configured to engage the pallet. The operations also include determining a baseline geometric representation of the face of the pallet based on the initial plurality of sensor data points. The operations additionally include determining an exclusion field between the vehicle and the baseline geometric representation based on a distance between the baseline geometric representation and the vehicle. The operations yet additionally include causing the vehicle to reposition the one or more tines relative to the pallet. The operations further include receiving, from the sensor, a subsequent plurality of sensor data points representing the position of the face of a pallet after repositioning the one or more tines relative to the pallet. The operations yet further include determining that more than a threshold number of sensor data points of the subsequent plurality of sensor data points are within the exclusion field and, in response, adjusting motion of the vehicle.

In an eighth embodiment, a system is provided that includes means for receiving, from a sensor on a vehicle, an initial plurality of sensor data points representing a position of a face of a pallet within an environment. The vehicle has one or more tines configured to engage the pallet. The system also includes means for determining a baseline geometric representation of the face of the pallet based on the initial plurality of sensor data points. The system additionally includes means for determining an exclusion field between the vehicle and the baseline geometric representation based on a distance between the baseline geometric representation and the vehicle. The system yet additionally includes means for causing the vehicle to reposition the one or more tines relative to the pallet. The system further includes means for receiving, from the sensor, a subsequent plurality of sensor data points representing the position of the face of a pallet after repositioning the one or more tines relative to the pallet. The system yet further includes means for determining that more than a threshold number of sensor data points of the subsequent plurality of sensor data points are within the exclusion field. The system still further includes means for adjusting motion of the vehicle in response to determining that more than the threshold number of sensor data points of the subsequent plurality of sensor data points are within the exclusion field.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
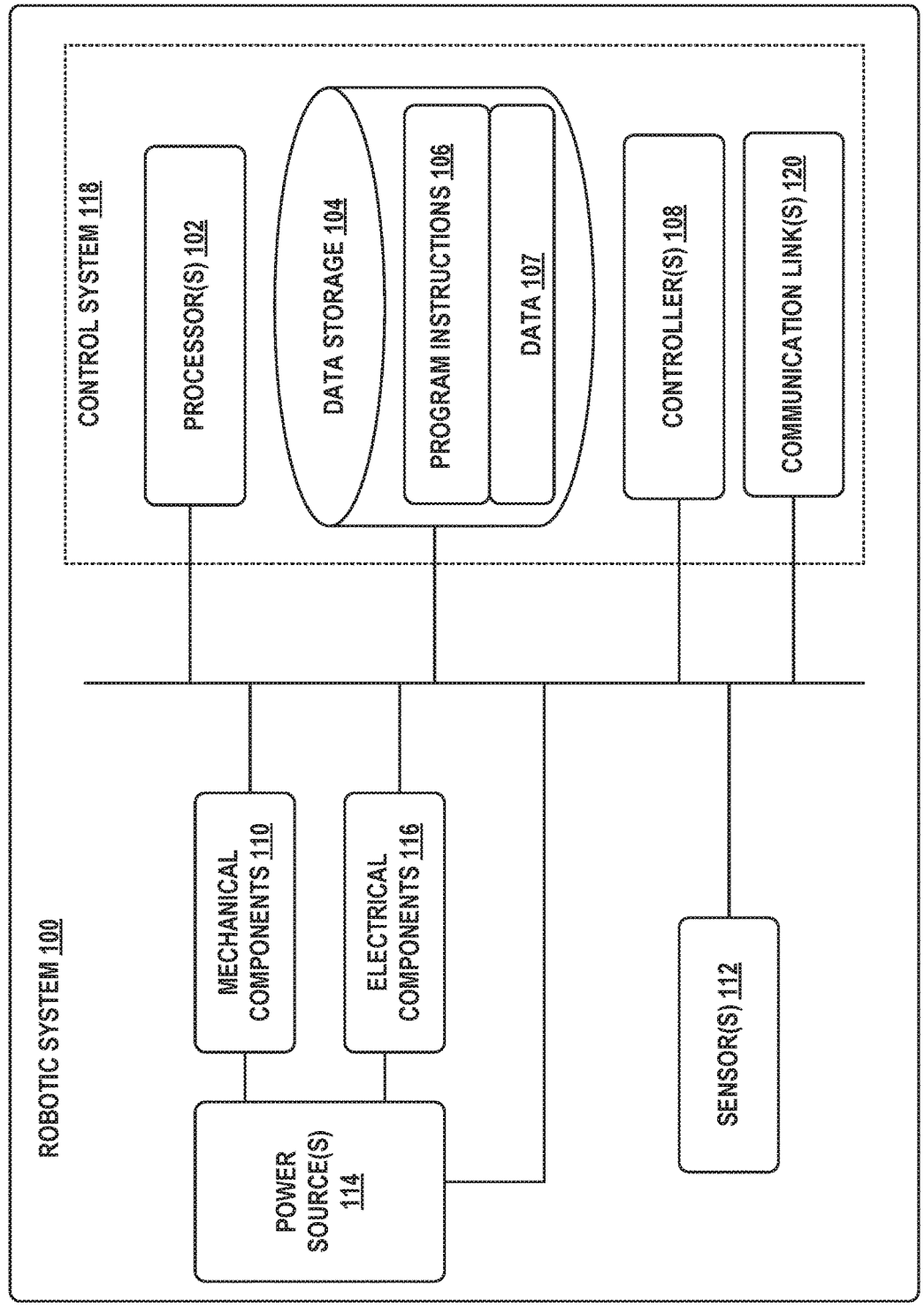
FIG. 1A illustrates a block diagram of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Robotic navigation in an environment such as a warehouse can allow autonomous robotic devices to carry out one or more actions without the need for constant human control. The warehouse may store various items, often loaded onto standardized pallets which facilitate efficient storage and transport of the items. Accordingly, robotic devices operating in warehouses may often take the form of autonomous vehicles such as fork trucks and pallet jacks having tines configured to engage with the pallets. The size of the tines and the spacing therebetween may be matched to the size and spacing of openings on the pallets to allow for smoothing engagement, pick-up, transportation, drop-off, and disengagement of the pallets.

However, even when the tines are matched to the pallet openings, an autonomous vehicle may sometimes snag a tine on the pallet or otherwise inadvertently displace the pallet while placing tines into the pallet during engagement or removing the tines from the pallet during disengagement. This may result in the pallet being pushed or dragged by the vehicle, preventing proper pallet pick-up or drop-off, and potentially causing damage to the pallet or the warehouse environment. A snag may occur due to errors or inaccuracies in positioning of the vehicle relative to the pallet before and/or during engagement or disengagement, or due to a piece of the pallet or the load disposed thereon protruding into the tine openings, among other possibilities.

Disclosed herein are operations that facilitate detection of accidental pallet displacement and modifying motion of the vehicle or the tines to avoid further accidental displacement. During pallet pick-up, for example, a control system of the vehicle may detect a pallet in the environment. Before the vehicle begins to engage the pallet, the control system may receive, from a sensor on the vehicle, an initial plurality of sensor data points representing distances to physical features, including the pallet, within the environment. The sensor may generate data indicative of at least two dimensions. The sensor may be, for example, a planar light detection and ranging (LIDAR) sensor, a three-dimensional (3D)) LIDAR sensor, a ToF camera. Since the sensor may be connected to the vehicle, the plurality of sensor data points may be transformed from a reference frame of the vehicle to a reference frame of the environment. Thus, the pallet's position and orientation (i.e., its pose) within the environment may be determined.

The pallet's pose may be used to determine a zone of interest which will be monitored for sensor data points that define a face of the pallet. The face of the pallet may be defined by the pallet, as well as any load disposed thereon. The zone of interest may be used as a filter to remove any sensor data points that are not likely to represent the face of the pallet because they are positioned too far away from where the face of the pallet is expected to be.

The control system may generate a baseline geometric approximation or representation of the initial sensor data points that likely correspond to the face of the pallet. This baseline geometric representation may represent the pose of the pallet within the environment before the pallet is engaged by the vehicle (i.e., the pallet's initial resting or undisturbed pose), and may be "locked-in" for later reference.

Within examples, a geometric representation may be a transformation of a plurality of sensor data points into a simplified, filtered, or refined form that facilitates tracking and comparison of successive groups of sensor data points, where the sensor data points are represented in at least two dimensions. The geometric representation may be a line, a plane, or a center of mass, among other possibilities, and may be fitted to the sensor data points that correspond to the face of the pallet. Thus, the geometric representation may operate to average or smooth out the sensor data points, thereby providing a more stable reference than the raw sensor data.

As the vehicle engages the pallet, penetrating it with the tines, updated geometric representations may be periodically refitted to new sensor data points generated by the sensor. The updated geometric representations may represent poses of the face of the pallet at different times during engagement. Notably, the pallet is expected to remain stationary in the environment during engagement. That is, the pose of the pallet is not expected to change until the vehicle lifts the pallet up on the tines after engagement is completed. Therefore, successful and smooth engagement is signaled by the updated geometric representations approximating or not deviating from the baseline geometric representation.

If, however, one or more of the updated geometric representations drift from the baseline geometric representation by more than a threshold extent or value, the vehicle may be stopped or its operation otherwise modified, since such drift from the baseline may indicate unplanned repositioning of the pallet. Drift of the updated geometric representation from the baseline geometric representation may be determined by computing a plurality of residuals, that is, differences between the values of the updated and baseline geometric representations at corresponding positions along these representations. Further, the control system may generate a warning or error signal, indicating to an operator of the warehouse that the vehicle is likely snagged on the pallet and may benefit from human assistance.

Modifying operation of the vehicle may involve repositioning the vehicle and/or the tines in an attempt to clear any snag causing the unplanned repositioning of the pallet. For example, during pallet engagement, the vehicle may be stopped, caused to back out of the pallet, and an alternative path may be determined for the vehicle to follow in order to re-attempt to engage the pallet. In another example, rather than backing out, the vehicle may be caused to pivot left or right to reposition the tines within the pallet openings. The direction in which the vehicle pivots may be a direction which provides least resistance or requires the least force, such that the tines are moved away from any obstruction in the pallet openings. Further, in another example, the tines may be lifted, lowered, or tilted to reposition them in the pallet openings. A combination of the above may also be attempted.

The operations described above may also be performed during pallet disengagement. That is, the baseline geometric representation may be determined after the pallet is placed down in the environment by the vehicle, and the updated geometric representations may be based on sensor data generated while the vehicle is backing away from the pallet to remove its tines therefrom.

Another approach for tracking the pose of the pallet during engagement and disengagement may involve using an exclusion field. As above, the control system may determine a baseline geometric representation of the face of the pallet before initiating engagement or disengagement of the pallet. Based on a distance between the vehicle and the baseline geometric representation, the control system may determine the exclusion field. The exclusion field may be an area or volume, situated between the vehicle and the pallet, and expected to be unoccupied by sensor data points. The exclusion field may be proportionally resized as the vehicle moves closer to or further away from the pallet. That is, the exclusion field may be expected to be empty or at least not contain therein any portion of the pallet. Thus, the presence of more than a threshold number of points representing the face of the pallet within the threshold region may indicate that the pallet has likely been repositioned in an unplanned manner.

Accordingly, rather than determining updated representations of the subsequent sensor data, the control system may monitor the exclusion field to determine whether more than the threshold number of points are found therein. The threshold number may be a fixed number or a percentage of a total number of points on the face of the pallet, among other possibilities. When the threshold region is found to intersect with or contain therein more than the threshold number of points, motion of the vehicle may be modified to avoid or mediate any potential snags. The shape of the exclusion field may vary, depending, for example, on the type of unplanned pallet displacement that is to be detected.

In some embodiments, the exclusion field may be used in combination with the updated geometric representations. For example, motion of the vehicle may be modified when a portion of the updated geometric representation enters or intersects with the exclusion field.

Notably, these approaches to pallet tracking may be performed without any additional sensors or hardware beyond those used by an autonomous vehicle to navigate. Pallets may be tracked during engagement and disengagement without, for example, the use of additional sensors (e.g., laser distance sensors) positioned on the tines, which may be undesirable due to such sensors potentially limiting the usable length of the tines and increasing the cost of the vehicle. Further, by fitting geometric representations to the raw sensor data or using the exclusion field, the control system may reduce the incidence of false positive detections of unplanned pallet motion, as compared with relying on the raw sensor data alone. Additionally, by using sensors configured to scan the environment in at least two dimensions, the face of the pallet can be represented more densely than with sensors that provide one-dimensional data (e g., laser distance sensors). Analysis of the 2D or 3D data may be simplified by fitting a geometric representation thereto.

II. Example System Design

Referring now to the Figures, FIG. 1A illustrates an example configuration of a robotic system that may be used in connection with the embodiments described herein. Robotic system 100 may be configured to operate autonomously, semi-autonomously, or using directions provided by user(s). Robotic system 100 may be a vehicle implemented in various forms, such as forklifts, pallet jacks, cars, trucks, motorcycles, buses, boats, airplanes, helicopters, lawn mowers, earth movers, boats, snowmobiles, aircraft, recreational vehicles, amusement park vehicles, farm equipment, construction equipment, warehouse equipment, trams, golf carts, trains, and trolleys. Other forms are possible as well. Furthermore, robotic system 100 may also be referred to as a robot, robotic device, mobile robot, or robotic vehicle, among other designations.

As shown in FIG. 1, robotic system 100 may include processor(s) 102, data storage 104, and controller(s) 108, which together may be part of a control system 118. Robotic system 100 may also include sensor(s) 112, power source(s) 114, mechanical components 110, electrical components 116, and communication link(s) 120. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, electrical components 116, or communication link(s) 120.

Data storage 104 may be one or more types of hardware memory. For example, data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, data storage 104 can be a single physical device. In other embodiments, data storage 104 can be implemented using two or more physical devices, which may communicate with one another via wired or wireless communication. As noted previously, data storage 104 may include computer-readable program instructions 106 and data 107. Data 107 may be any type of data, such as configuration data, sensor data, and/or diagnostic data, among other possibilities.

Controller 108 may include one or more electrical circuits, units of digital logic, computer chips, and/or microprocessors that are configured to (perhaps among other tasks) interface between any combination of mechanical components 110, sensor(s) 112, power source(s) 114, electrical components 116, control system 118, communication link(s) 120, and/or users of robotic system 100. In some embodiments, controller 108 may be a purpose-built embedded device for performing specific operations with one or more subsystems of robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. For instance, control system 118 may include various components for communicating with robotic system 100, including a joystick, buttons, and/or ports, etc. The example interfaces and communications noted above may be implemented via a wired or wireless connection, or both. Control system 118 may perform other operations for robotic system 100 as well.

In some implementations, control system 118 of robotic system 100 may also include communication link(s) 120 configured to send and receive information. Communication link(s) 120 may transmit data indicating the state of the various components of robotic system 100. For example, information read by sensor(s) 112 may be transmitted via communication link(s) 120 to a separate device. Other diagnostic information indicating the integrity or health of power source(s) 114, mechanical components 110, electrical components 116, processor(s) 102, data storage 104, or controller 108 may be transmitted via communication link(s) 120 to an external communication device.

In some implementations, robotic system 100 may receive information at communication link(s) 120 that is then processed by processor(s) 102. The received information may indicate data that is accessible by processor(s) 102 during execution of program instructions 106. Further, the received information may change aspects of controller(s) 108 that may affect the behavior of mechanical components 110 or electrical components 116. In some cases, the received information may indicate a query requesting a piece of information (e.g. the operational state of one or more of the components of robotic system 100). Processor(s) 102 may subsequently transmit the piece of information back out via communication link(s) 120.

In some cases, communication link(s) 120 may include a wired connection. Robotic system 100 may include one or more ports to interface communication link(s) 120 to an external device. Communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, control system 118 may communicate with other systems of robotic system 100 via wired or wireless connections, and may further be configured to communicate with one or more users or operators of the vehicle. As one possible illustration, control system 118 may receive an input (e.g., from a user or from another vehicle) indicating an instruction to move a pallet from a first location of a warehouse to a second location of the warehouse. The input to control system 118 may be received via communication link(s) 120.

Based on this input, control system 118 may perform operations to cause robotic system 100 to use sensors 112 to analyze the environment of the warehouse to locate the pallet and subsequently use mechanical components 110 to pick up and move the pallet.

Operations of control system 118 may be carried out by processor(s) 102. Alternatively, these operations may be carried out by controller 108, or a combination of processor(s) 102 and controller 108. In some embodiments, control system 118 may partially or wholly reside on a device other than robotic system 100, and therefore may at least in part control robotic system 100 remotely. Communication link(s) 120 may be used at least in part to carry out the remote communication.

Mechanical components 110 represent hardware of robotic system 100 that may enable robotic system 100 to perform physical operations. As a few examples, robotic system 100 may include physical members such robotic arm(s), wheel(s), track(s), linkage(s), and/or end effector(s). The physical members or other parts of robotic system 100 may further include motors and actuators arranged to move the physical members in relation to one another. Robotic system 100 may also include one or more structured bodies for housing control system 118 or other components, and may further include other types of mechanical components. Mechanical components 110 used in a given robot may vary based on the design of the robot, and may also be based on the operations and/or tasks the robot may be configured to perform.

In some examples, mechanical components 110 may include one or more removable components. Robotic system 100 may be configured to add and/or remove such removable components, which may involve assistance from a user and/or another robot. For example, robotic system 100 may be configured with removable arms, linkages, and/or end effectors so that these members can be replaced or changed as needed or desired based on a task robotic system 100 is expected or planned to perform. In some embodiments, robotic system 100 may include one or more removable and/or replaceable battery units or sensors. Other types of removable components may be included within some embodiments.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for three-dimensional (3D) vision), a global positioning system (GPS) transceiver, and/or other sensors for capturing information of the environment in which robotic system 100 is operating. Sensor(s) 112 may monitor the environment in real time, and detect obstacles, elements of the terrain, weather conditions, temperature, and/or other aspects of the environment.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such the operation of wheels, linkages, actuators, end effectors, and/or other mechanical and/or electrical features of robotic system 100. The data provided by sensor(s) 112 may enable control system 118 to determine errors in operation as well as monitor overall operation of components of robotic system 100.

As an example, robotic system 100 may use a time-of-flight (ToF) camera to scan portions of the environment to detect obstacles along a planned path of the vehicle, identify environmental landmarks within an environment of robotic system 100, and locate objects of interest, such as pallets or boxes. The ToF camera may have a limited field of view. Mechanical components 110 and electrical components 116 may work in coordination to move the ToF camera along a trajectory to direct a field of view of the ToF camera at different portions of the environment.

As another example, sensor(s) 112 may include one or more velocity and/or acceleration sensors. Sensor(s) 112 may measure both linear and angular velocity and/or acceleration. For instance, sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicated discussed herein. Additionally or alternatively, robotic system 100 may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, and/or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources. Any type of power source may be used to power robotic system 100, such as electrical power or a gasoline engine. Power source(s) 114 may charge using various types of charging, such as wired connections to an outside power source, wireless charging, combustion, or other examples.

Electrical components 116 may include various mechanisms capable of processing, transferring, and/or providing electrical charge or electric signals. Among possible examples, electrical components 116 may include electrical wires, circuitry, and/or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to mechanical components 110, for example. Further, robotic system 100 may include electric motors. Other examples of electrical components 116 may exist as well.

Although not shown in FIG. 1A, robotic system 100 may include a chassis and/or an operator cabin, which may connect to or house components of robotic system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry sensor(s) 112. These sensors may be positioned in various locations on robotic system 100, such as on top of the chassis to provide a high vantage point for sensor(s) 112.

Robotic system 100 may carry a load, such as a type of cargo that is to be transported. The load may also represent external batteries or other types of power sources (e.g., solar panels) that robotic system 100 may utilize. Carrying the load represents one example use for which robotic system 100 may be configured, but robotic system 100 may be configured to perform other operations as well.

III. Example Vehicles

Figure 1B:
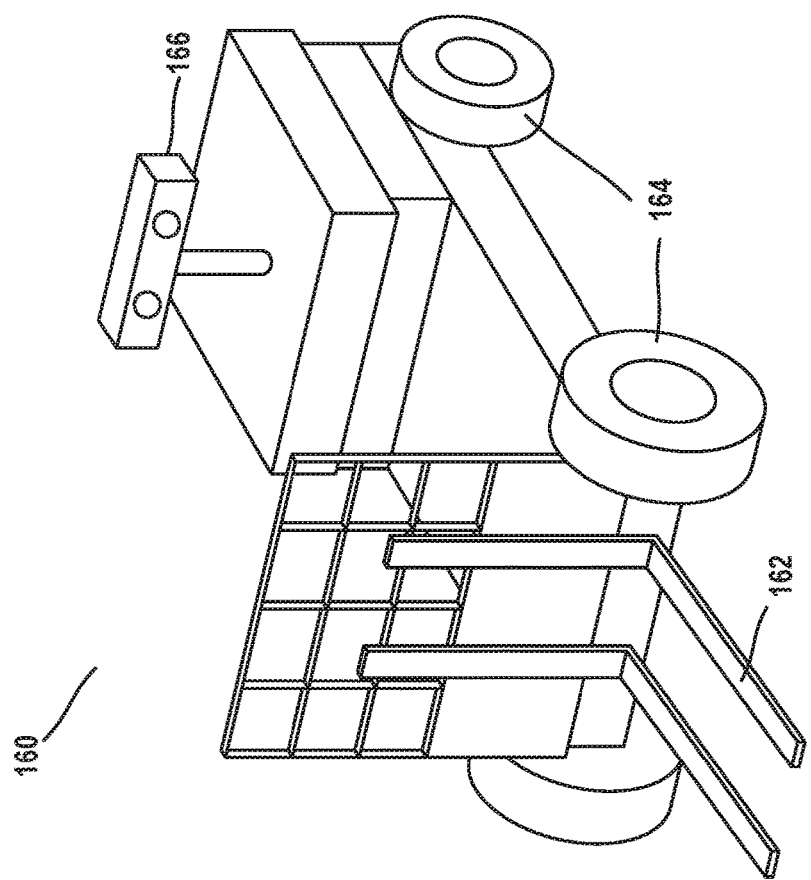
FIG. 1B illustrates an autonomous fork truck, in accordance with example embodiments.

FIG. 1B illustrates an example vehicle that may embody robotic system 100. Other vehicles which vary in form from those illustrated here as well as other types of robotic devices may also be included.

FIG. 1B shows an autonomous fork truck, according to an example embodiment. More specifically, autonomous fork truck 160 may include forklift 162 for lifting and/or moving pallets of boxes or other larger materials. In some examples, forklift 162 may be elevated to reach different racks of a storage rack or other fixed storage structure within a warehouse. Autonomous fork truck 160 may additionally include wheels 164 for locomotion to transport pallets within the warehouse. In additional examples, the autonomous fork truck may include a motor and power supply as well as a sensing system. Autonomous fork truck 160 may also vary in size or shape from the one illustrated in FIG. 1B.

Further, autonomous fork truck 160 may include sensor 166 connected thereto and configured to move (e.g., rotate and/or translate) with respect to autonomous fork truck 160 to scan different portions of the environment. In some embodiments, sensor 166 may be connected to a different portion of autonomous fork truck 160 than shown in FIG. 1B. For example, sensor 166 ay be connected nearby (e.g, above) forklift 162 so as to have a direct, unobstructed view of pallets or other objects to be loaded or unloaded using forklift 162. Autonomous fork truck 160 may also include additional sensors (not shown) mounted to the front, rear, and sides of autonomous fork truck 160.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g, Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

IV. Example Computing Device Architecture

Figure 2A:
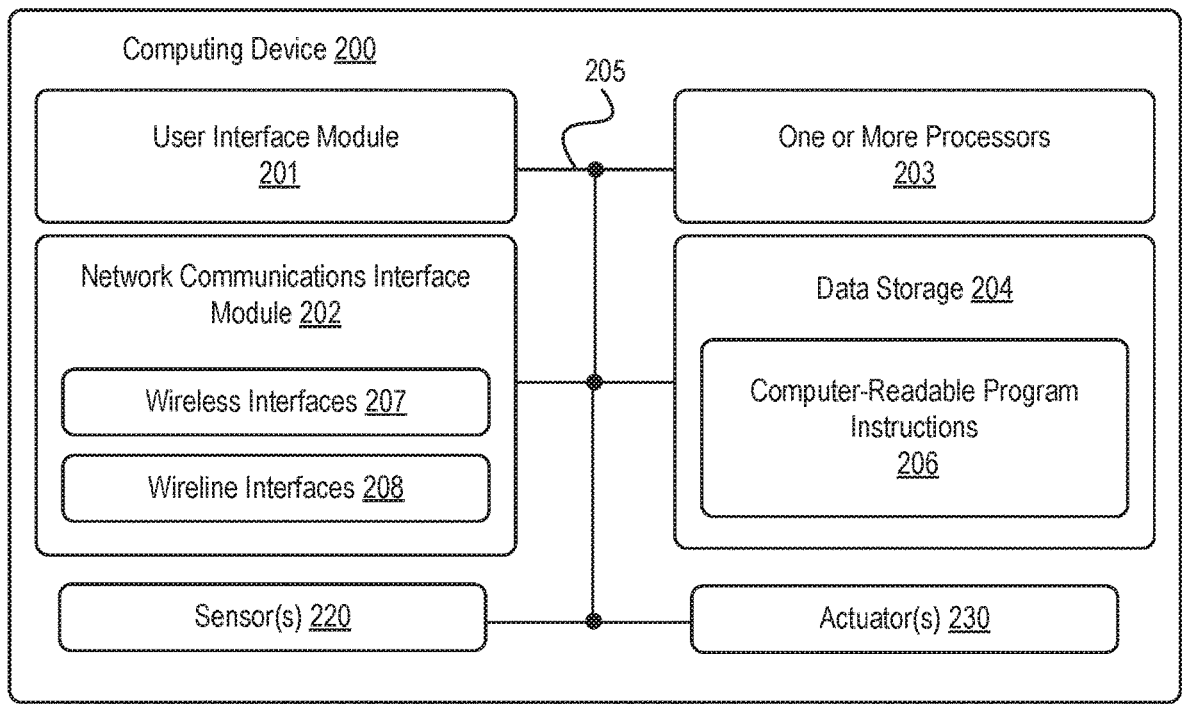
FIG. 2A illustrates a block diagram of an example computing device, in accordance with example embodiments.

FIG. 2A is a functional block diagram of computing device 200 (e.g., system, in accordance with example embodiments. Computing device 200 shown in FIG. 2A can be configured to perform at least one function related to any methods or operations herein described. Computing device 200 may include a user interface module 201, a network-communication interface module 202, one or more processors 203, data storage 204, one or more sensors 220, and one or more actuators 230, all of which may be linked together via a system bus, network, or other connection mechanism 205. In some embodiments, computing device 200 can be configured to act as part or all of a warehouse control system.

User interface module 201 can be operable to send data to and/or receive data from external user input/output devices. For example, user interface module 201 can be configured to send and/or receive data to and/or from user input devices such as a keyboard, a keypad, a touch screen, a computer mouse, a trackball, a joystick, a camera, a voice recognition module, and/or other similar devices. User interface module 201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 207 and/or one or more wireline interfaces 208 that are configurable to communicate via a network. Wireless interfaces 207 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processors 203 can include one or more general purpose processors, and/or one or more special purpose processors (e.g., digital signal processors, graphics processing units, application specific integrated circuits, etc.). Processors 203 can be configured to execute computer-readable program instructions 206 that are contained in the data storage 204 and/or other instructions as described herein.

Data storage 204 can include one or more computer-readable storage media that can be read and/or accessed by at least one of processors 203. The one or more computer-readable storage media can include volatile and/or non-volatile storage components, such as optical, magnetic, organic or other memory or disc storage, which can be integrated in whole or in part with at least one of processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206 and perhaps additional data. In some embodiments, data storage 204 can additionally include storage required to perform at least part of the herein-described methods and techniques and/or at least part of the functionality of the devices and networks.

In some embodiments, computing device 200 can include one or more sensors 220. Sensor(s) 220 can be configured to measure conditions in an environment for computing device 200 and provide data about that environment. For example, sensor(s) 220 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 200, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 200, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 200, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 220 are possible as well.

Computing device 200 can include one or more actuators 230 that enable computing device 200 to initiate movement. For example, actuator(s) 230 can include or be incorporated with robotic joints connecting robotic limbs to a robotic body. For example, actuator(s) 230 can include respective robotic hip and robotic shoulder joints connecting respective robotic legs and arms to the robotic body. Further, the actuator(s) 230 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 230 can include respective robotic ankle joints connecting the robotic legs to robotic feet and respective robotic wrist joints connecting the robotic arms to robotic hands. In addition, actuator(s) 230 can include motors for moving the robotic limbs. As such, the actuator(s) 230 can enable mobility of computing device 200. Many other examples of actuator(s) 230 are possible as well.

Figure 2B:
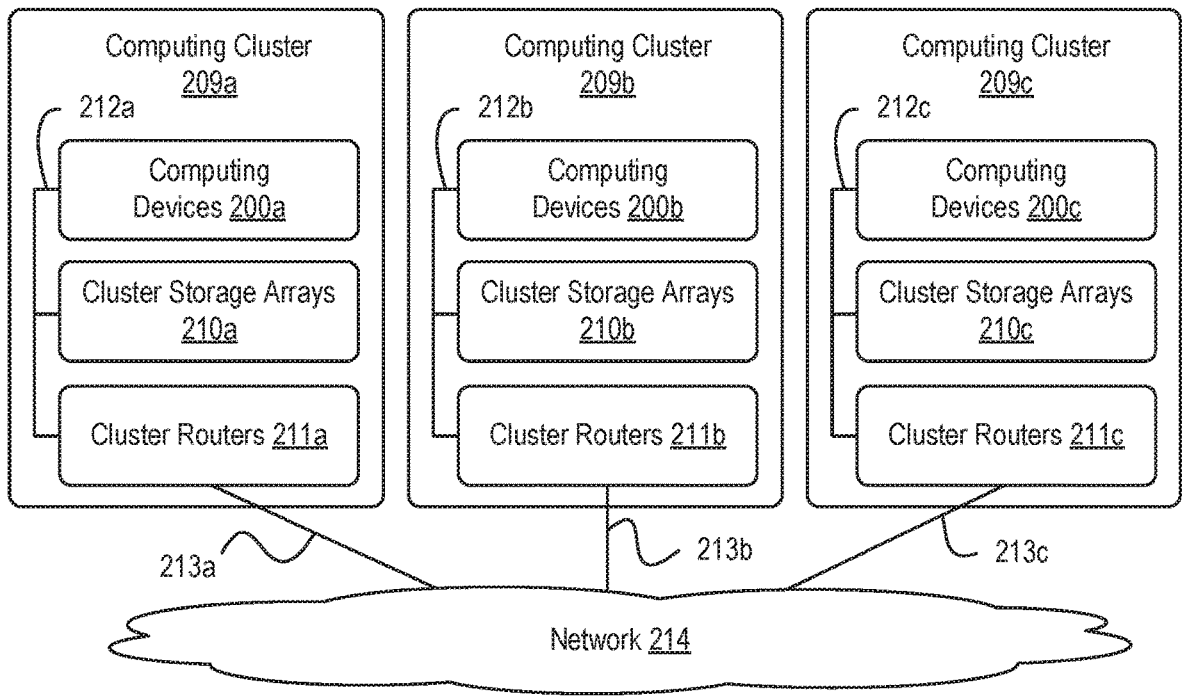
FIG. 2B illustrates a network of computing clusters arranged as a cloud-based server system, in accordance with example embodiments.

FIG. 2B depicts a network 214 of computing clusters 209a, 209b, 209c arranged as a cloud-based server system in accordance with example embodiments. Computing clusters 209a, 209b, 209c can be cloud-based devices that store program logic and/or data of cloud-based applications and/or services; e.g., perform at least one function related to any methods or operations herein described.

In some embodiments, computing clusters 209a, 209b, 209c can be a single computing device residing in a single computing center. In other embodiments, computing clusters 209a, 209b, 209c can include multiple computing devices in a single computing center, or even multiple computing devices located in multiple computing centers located in diverse geographic locations. For example, FIG. 2B depicts each of computing clusters 209a, 209b, 209c residing in different physical locations.

In some embodiments, data and services at computing clusters 209a, 209b, 209c can be encoded as computer readable information stored in non-transitory, tangible computer readable media (or computer readable storage media) and accessible by other computing devices. In some embodiments, computing clusters 209a, 209b, 209c can be stored on a single disk drive or other tangible storage media, or can be implemented on multiple disk drives or other tangible storage media located at one or more diverse geographic locations.

In FIG. 2B, functionality of a planning system can be distributed among three computing clusters 209a, 209b, and 209c. Computing cluster 209a can include one or more computing devices 200a, cluster storage arrays 210a, and cluster routers 211a connected by a local cluster network 212a. Similarly, computing cluster 209b can include one or more computing devices 200b, cluster storage arrays 210b, and cluster routers 211b connected by a local cluster network 212b. Likewise, computing cluster 209c can include one or more computing devices 200c, cluster storage arrays 210c, and cluster routers 211c connected by a local cluster network 212c.

In some embodiments, each of the computing clusters 209a, 209b, and 209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of a planning system, a robotic device, and/or a computing device. In one embodiment, the various functionalities of a planning system, a robotic device, and/or a computing device can be distributed among one or more computing devices 200a, 200b, and 200c. Computing devices 200b and 200c in respective computing clusters 209b and 209c can be configured similarly to computing devices 200a in computing cluster 209a. On the other hand, in some embodiments, computing devices 200a, 200b, and 200c can be configured to perform different functions.

In some embodiments, computing tasks and stored data associated with a planning system, a robotic device, and/or a computing device can be distributed across computing devices 200a, 200b, and 200c based at least in part on the processing requirements of a roadmap editor, single agent planning software, multiple agent planning software, a routing computing device, and/or a computing device, the processing capabilities of computing devices 200a, 200b, and 200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 210a, 210b, and 210c of the computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a planning system, a robotic device, and/or a computing device can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays can be configured to store one portion of the data of a planning system, a robotic device, and/or a computing device can, while other cluster storage arrays can store other portion(s) of data of a planning system, a robotic device, and/or a computing device. Additionally, some cluster storage arrays can be configured to store backup versions of data stored in other cluster storage arrays.

The cluster routers 211a, 211b, and 211c in computing clusters 209a, 209b, and 209c can include networking equipment configured to provide internal and external communications for the computing clusters. For example, the cluster routers 211a in computing cluster 209a can include one or more internet switching and routing devices configured to provide (i) local area network communications between the computing devices 200a and the cluster storage arrays 210a via the local cluster network 212a, and (ii) wide area network communications between the computing cluster 209a and the computing clusters 209b and 209c via the wide area network connection 213a to network 214. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that can contribute to the cost, speed, fault-tolerance, resiliency, efficiency and/or other design criteria of the moderation system architecture.

V. Example Pallet Tracking Using Geometric Fitting in 2D

Figure 3:
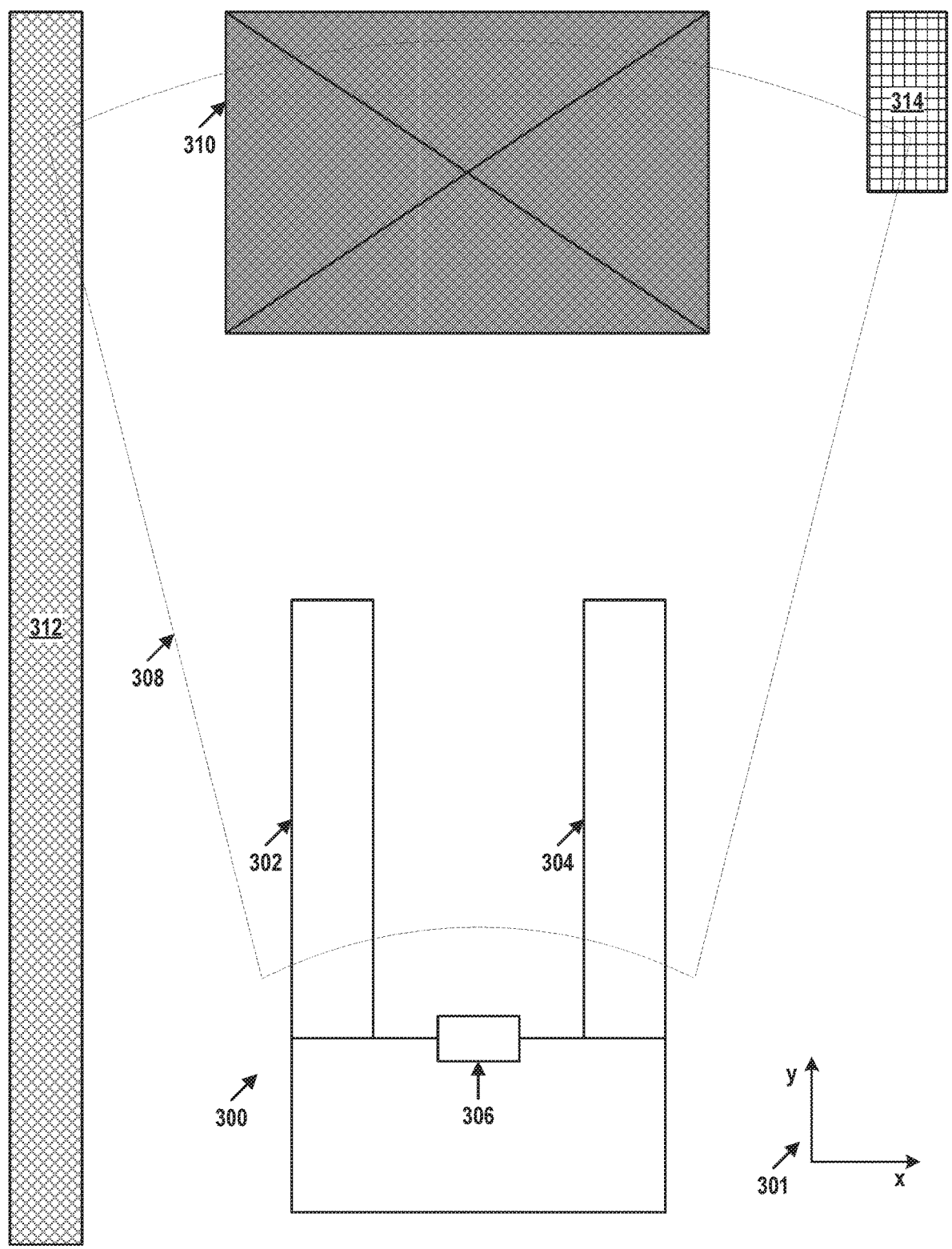
FIG. 3 illustrates a sensor scanning a pallet, in accordance with example embodiments.

FIG. 3 illustrates a top-down view of vehicle 300, which includes tines 302 and 304 as well as sensor 306, operating in an environment that includes pallet racks 312 and 314 as well as pallet 310. The position of vehicle 300, as well as the positions of features within the environment, may be represented in reference frame 301. Reference frame 301 may include an x-axis, a y-axis, and a z-axis (not shown) orthogonal to each of the x and y axes.

Vehicle 300 may be an autonomous pallet jack, fork truck, or other robotic device having one or more tines (e.g., tines 302 and 304) configured to interface with pallet 310. Pallet 310 may be a flat transport structure configured to support on top thereof various goods or items (i.e., a pallet load), which may be secured to pallet 310 with straps, belts, harnesses, stretch wrap, or shrink wrap, among other possibilities. Pallet 310 may take on various dimensions, such as those set forth by the International Organization for Standardization (ISO), for example. The size and spacing of tines 302 and 304 may be adjusted to accommodate pallets of different sizes. In some examples, additional tines may be added, or tines may be removed (e.g., vehicle 300 may utilize one large tine).

The operations performed by vehicle 300 within the environment may involve picking up, moving, and dropping off pallet 310. In order to pick up pallet 310, vehicle 300 may use sensor 306 to scan the environment in two or more dimensions, as indicated by region 308, to first identify pallet 310. Region 308 may represent a field of view, or portion thereof, of sensor 306. Depending on the type of sensor, region 308 may be smaller or larger than shown.

In some embodiments, sensor 306 may be fixed with respect to vehicle 300, and vehicle 300 may thus need to be repositioned to reposition region 308 and have sensor 306 scan different portions of the environment. Alternatively, sensor 306 may be movable with respect to vehicle 300. That is, sensor may be translatable in one or more degrees of freedom (e.g., along the x-axis, y-axis, or z-axis) and/or rotatable in one or more degrees of freedom (e.g., yaw, pitch, roll), thus controlling the position and orientation of region 308. A LIDAR sensor, for example, may be rotatable with respect to vehicle 300 to sweep out a 360-degree field around vehicle 300.

Figure 4:
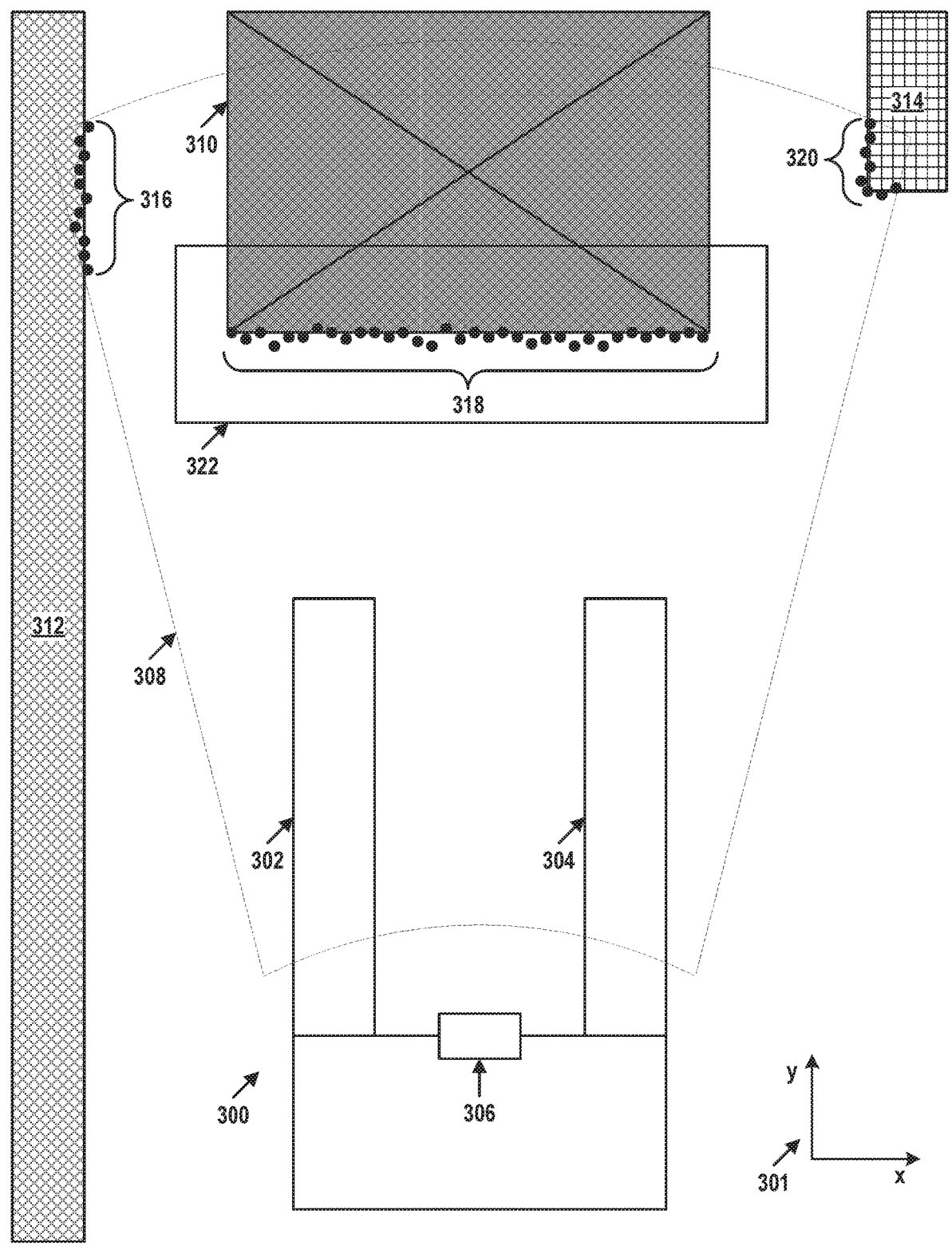
FIG. 4 illustrates a zone of interest in an environment, in accordance with example embodiments.

A control system may receive a plurality of sensor data points from sensor 306, as shown in FIG. 4. The data generated by sensor 306 may represent or may be used to determine distances between sensor 306 and physical features within the environment. The sensor data may be represented in a reference frame of vehicle 300. The sensor data may, based on a position of vehicle 300 within the environment, be transformed into a reference frame of the environment (e.g., reference frame 301). This transformation may allow sensor data from multiple vehicles to be synchronized into one shared map representative of the environment. However, this transformation may also result in any errors in the perceived position and/or orientation of vehicle 300 within the environment being carried over as errors in the positions of any objects represented by the sensor data.

In some embodiments, the map may be represented as an occupancy grid that includes a number of cells that represent corresponding areas in the environment. The control system may develop the occupancy grid within reference frame 301, or a reference frame that corresponds to a point-of-view (POV) of the sensor (e.g., sensor 306). Each cell may be assigned a state that indicates a status of the area represented by the cell. Particularly, a cell may be assigned as having an obstacle, free space, or unknown. Cells with obstacles may represent physical features within the environment, including fixed, movable, and mobile objects. Cells with free space may be traversable by vehicle 300 without striking objects in the environment. Unknown cells may require additional sensor data to determine whether the area includes an obstacle or not (i.e., has free space). The control system may periodically update and adjust the occupancy grid based on new measurements of the environment from sensors coupled to one or more vehicles navigating the environment.

The sensor data received from sensor 306 may include first group of sensor data points 316, second group of sensor data points 318, and third group of sensor data points 320. First group of sensor data points 316 may represent a portion of pallet rack 312, second group of sensor data points 318 may represent a portion of pallet 310, and third group of sensor data points 320 may represent a portion of pallet rack 314. Additional sensor data points may be received as either vehicle 300 or sensor 306 is repositioned, thus repositioning region 308, to scan different portions of the environment.

Sensor data point groups 316, 318, and 320, may be used to identify pallet 310, and determine the position and orientation (i.e., the pose) of pallet 310 within the environment. In some embodiments, past sensor data from sensor 306, representing different portions of the environment, may also be used to assist with identification of pallet 310. Similarly, past and current sensor data from additional sensors on vehicle 300 or on other vehicles within the environment may be used to identify pallet 310. The determined position and orientation of pallet 310 may be used to determine a path for vehicle 300 to follow to engage pallet 310 by penetrating the openings thereof with tines 302 and 304. The determined position and orientation may also be used to monitor pallet 310 during engagement and pick-up for changes in pose which might indicate that pallet 310 is being pushed or dragged by tines 302 and 304, rather than being smoothly penetrated thereby.

The control system may define zone of interest 322 within the environment. Zone of interest 322 may be an area determined or estimated to be occupied by the face of pallet 310, that is, a side of pallet 310 from which pallet 310 is planned to be penetrated with tines 302 and 304 (i.e., the bottom of pallet 310, as drawn). The face of pallet 310 may be defined by the side planned to be penetrated, as well as any load disposed on pallet 310. Zone 322 may be used by the control system as a filter to remove from the received sensor data any points that fall outside of a threshold distance from the face of the pallet. That is, zone 322 may be used to consider only the sensor data points likely to represent the face of the pallet while monitoring pallet 310 for unexpected movements during pallet engagement. Zone 322 may filter out some of the errors resulting from the transformation of the sensor data between the reference frame of vehicle 300 and the reference frame of the environment. The control system may use zone 322 to remove from consideration sensor data groups 316 and 320, and focus on sensor data group 318 in order to monitor changes in position and orientation of pallet 310 during pallet engagement.

Monitoring changes in the position and orientation of pallet 310 may involve determining, based on initial sensor data points (e.g., sensor data points in group 318), a baseline geometric representation of the face of pallet 310 before pallet 310 is engaged or penetrated by tines 302 and 304. As vehicle 300 moves towards pallet 310, repositioning tines 302 and 304 with respect thereto, subsequent sensor data may be used to determine updated geometric representations of the face of pallet 310.

Since pallet 310 should not move until tines 302 and 304 completely penetrate it and lift it up, the updated geometric representations should be similar to the baseline geometric representation. If one or more of the updated geometric representations deviates from the baseline geometric representation by more than a threshold extent or value, the control system may use this as a signal that pallet 310 is likely being pushed by tines 302 or 304, rather than being smoothly penetrated thereby. In response, the control system may modify motion of vehicle 300 to avoid pushing or dragging the pallet, and may generate a warning signal. Modifying motion of vehicle 300 may involve stopping vehicle 300, pivoting vehicle 300 to move tines 302 and 304 with respect to pallet 310, and/or determining an alternative path for vehicle 300 to follow to engage pallet 310.

Figure 5:
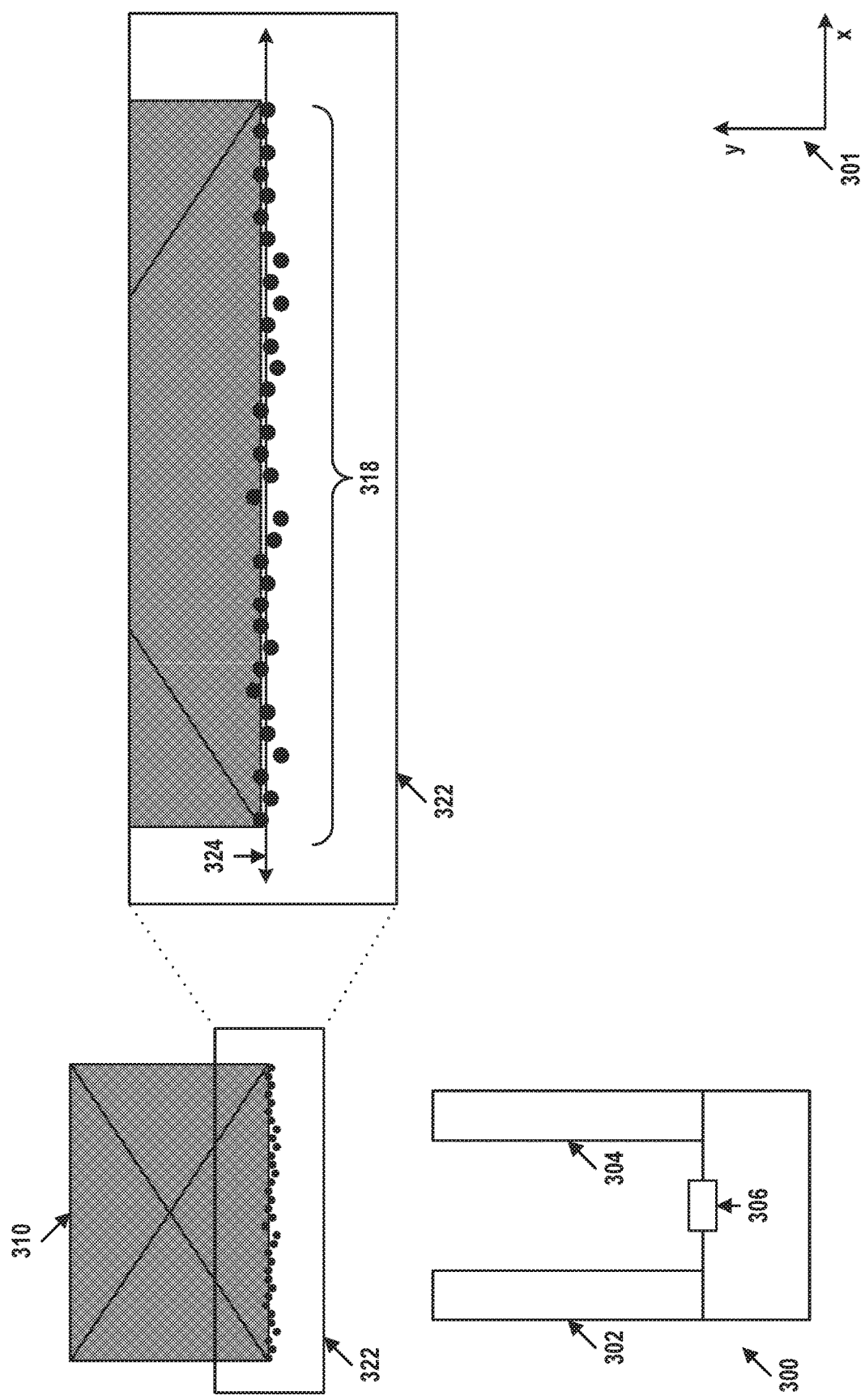
FIG. 5 illustrates a scan of a pallet, in accordance with example embodiments.

FIG. 5 illustrates an example baseline geometric representation that may be used to monitor the pose of pallet 310. The geometric representation may be a virtual geometric representation (i.e., defined in software). Zone 322 has been enlarged to show sensor data point group 318, representing an initial plurality of sensor data points, in more detail. The control system may fit line 324 to the sensor data points in group 318. Line 324 may represent the pose of the face of pallet 310 before pallet 310 is engaged or picked-up by vehicle 300 (i.e., before tines 302 and 304 enter pallet 310). Line 324 may thus be one example of a baseline geometric representation of the face of pallet 310. Line 324 may be a best-fit-line determined, for example, using least squares fitting.

Figure 6:
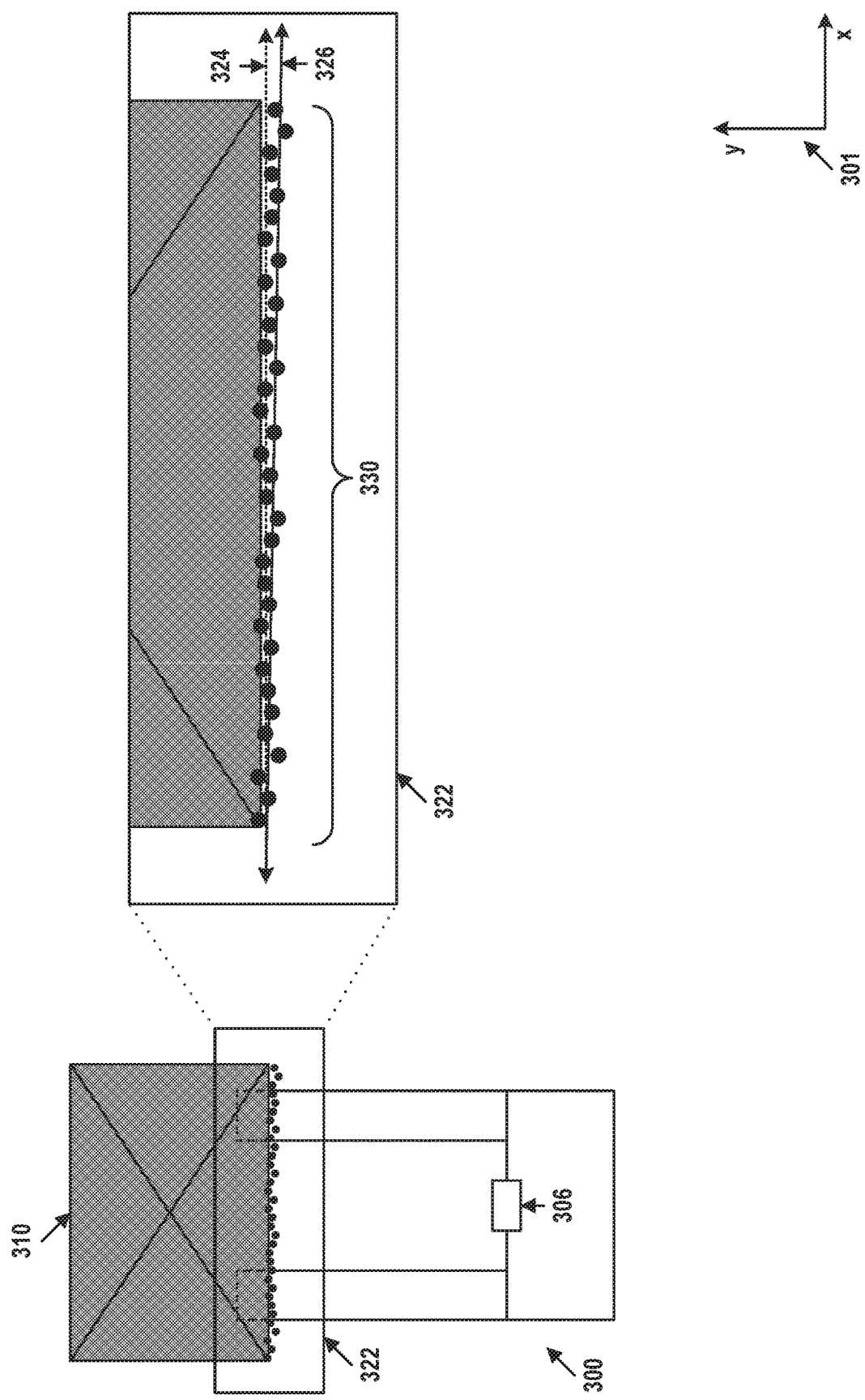
FIG. 6 illustrates a scan of a pallet, in accordance with example embodiments.

After determining the baseline geometric representation, that is, after determining line 324, vehicle 300 may proceed toward pallet 310 and begin to engage it, as illustrated in FIG. 6. As vehicle 300 moves towards pallet 310, the control system may receive subsequent sensor data from sensor 306. As before, the sensor data may be filtered using zone of interest 322 to consider only data points 330 along the face of pallet 310. The control system may then determine an updated geometric representation by fitting line 326 to data points 330. The updated geometric representation may be a virtual geometric representation. By comparing line 326 to line 324, the control system may determine whether line 326 deviates from line 324 by more than a threshold value.

Within examples, the threshold value may be a metric that allows for comparison of two different geometric representations of a given type (e.g., line, plane, center of mass). The threshold value may define a level of acceptable variation or difference between two different geometric representations of the given type. Variations or differences below or equal to the threshold value may be attributable, with at least a minimum confidence level, to various sources of noise in the system, including sensor inaccuracies and vehicle localization inaccuracies, among other possibilities. Variations or differences above the threshold value might not be attributable, with at least the minimum confidence level, to the various sources of noise in the system, and may therefore signal unplanned displacement of pallet 310. Thus, the threshold value may be determined and updated based on, for example, an accuracy or precision of sensor 306 to reduce or minimize false-positive detections of pallet movement.

In the case illustrated in FIG. 6, the control system may determine that line 326 does not deviate from line 324 by more than the threshold value. That is, movement of tines 302 and 304 through the pallet has not unexpectedly displaced the pallet within the environment, or has not done so to an appreciable extent. While the updated geometric representation (e.g., line 326) does not deviate from the baseline geometric representation (e.g., line 324), vehicle 300 may continue moving towards pallet 310 to engage it using tines 302 and 304.

Figure 7:
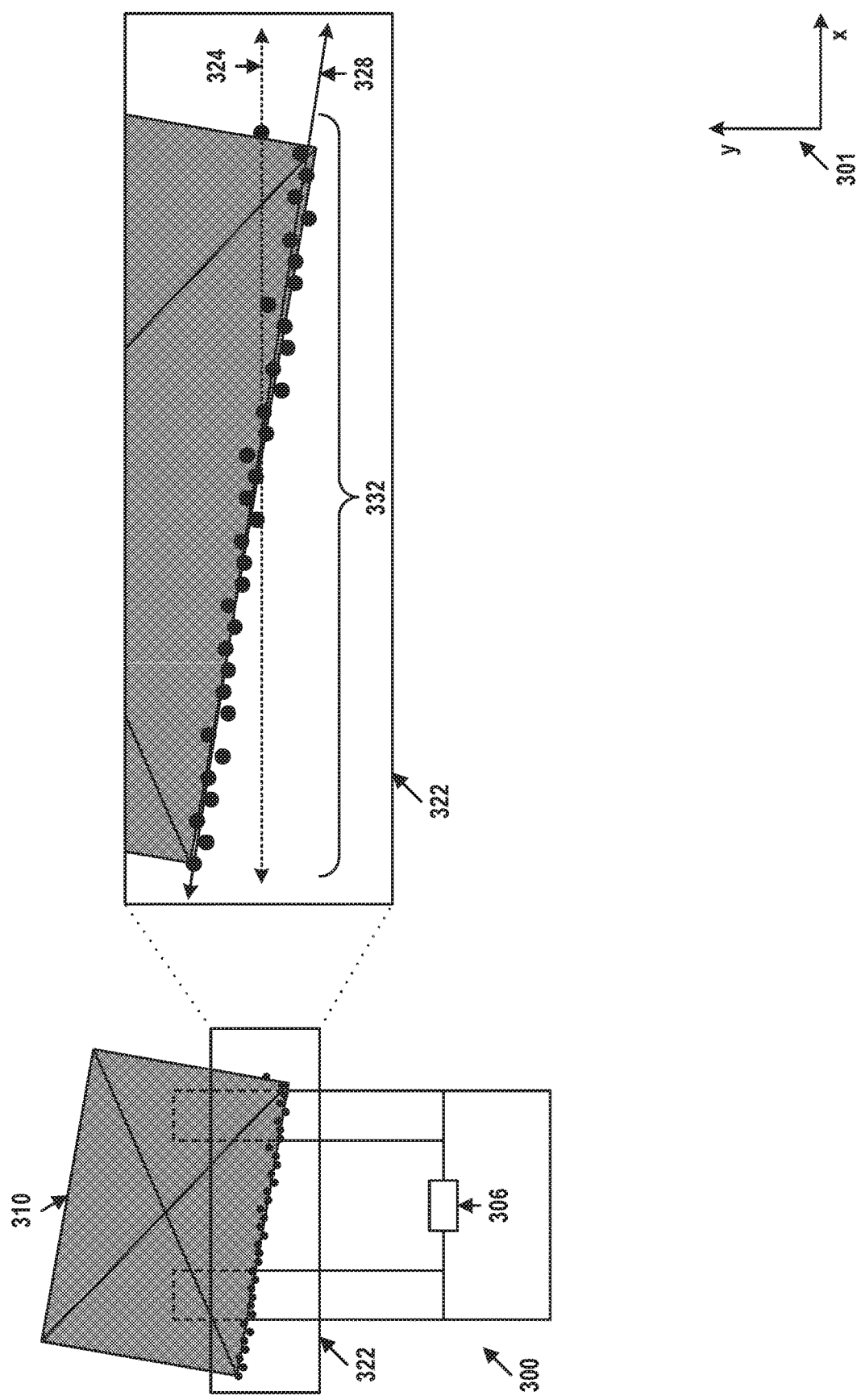
FIG. 7 illustrates a scan of a pallet, in accordance with example embodiments.

FIG. 7 illustrates pallet 310 displaced by tines 302 and 304 as they are repositioned by vehicle 300 to engage pallet 310. After moving tines 302 and 304 deeper into pallet 310, tines 302 and 304 may snag on a portion of pallet 310, rather than moving through it smoothly, thus inadvertently pushing pallet 310 through the environment. The snag may be caused by tine 302 or 304 missing the openings in pallet 310, tines 302 and 304 not moving through the middle of the tine openings in pallet 310, and thereby snagging a side of the openings, or by colliding with a board (e.g., a broken stringer, deck board, block board, etc.) or load protruding into the tine openings, among other possibilities.

This pushing of pallet 310 may be detected by the control system based on subsequent sensor data 332 from sensor 306. The control system may fit line 328 to sensor data points 332. The control system may then compare line 328, representing the updated geometric representation of the face of pallet 310, to line 324, representing the baseline geometric representation of the face of pallet 310, and determine that line 328 deviates from line 324 by more than the threshold value. That is, the control system may determine that the deviation between lines 328 and 324 is beyond that which could be attributed to sensor noise or inaccuracies.

In response, the control system may modify motion of vehicle 300 to avoid pushing pallet 310 further by stopping vehicle 300, causing vehicle 300 to pivot to shake free of any snag between pallet 310 and tines 302 and 304, determining a new path for vehicle 300 to follow to re-engage pallet 310 in a manner that avoids pushing it, and/or lifting, lowering, or pivoting tines 302 and 304 to break free of the snag. The control system may further generate a warning or error signal to, for example, inform an operator of the warehouse in which vehicle 300 is operating of the inadvertent pushing of pallet 310.

In some embodiments, the modification to motion of vehicle 300 may be determined by the control system based on lines 324, 326, and 328 (i.e., based on the baseline geometric representation, as well as any updated geometric representations). That is, motion of vehicle 300 may be modified based on how pallet 310 is being pushed, dragged, or otherwise inadvertently repositioned by tines 302 and 304.

For example, the updated lines (i.e., the updated geometric representations) may be moving further away from line 324, but the angle between the updated lines and line 324 might not be changing. This may indicate that tines 302 and 304 have each snagged on pallet 310 and are symmetrically pushing it or dragging it. Thus, the control system may determine to raise, lower, or pivot tines 302 and 304 about the x-axis, for example, to reposition them relative to the pallet openings in an attempt to free any snag. In another example, the updated lines may both be moving further away from line 324 and the angle between the updated lines and line 324 might be changing. This may indicate that only one of tines 302 and 304 has snagged on pallet 310. Thus, the control system may determine to pivot vehicle 300 about the z-axis, or if possible, to raise or lower the tines individually, in an attempt to free any snag. Accordingly, in general, the control system may be configured to determine a modification to the motion of vehicle 300 based on one or more of a displacement and an angular relationship between the baseline geometric representations and one or more of the updated geometric representations.

Further, in some embodiments, the control system may also provide the operator with a visualization of vehicle 300 and pallet 310. The visualization may include, for example, an animation of vehicle 300 over a period of time leading up to the detected unplanned movement of pallet 310. The visualization may also include lines 324, 326, and 328 to help illustrate the unplanned movement. The control system may prompt the operator to select, based on the visualization, a course of action for the vehicle to follow to remedy any potential snag between vehicle 300 and pallet 310, and avoid further unplanned repositioning (e.g., pushing or dragging) of pallet 310 (e.g., wait, pivot, tilt tines, etc.).

The operations described above may also be performed to identify unexpected pallet movement during pallet disengagement, that is, as vehicle 300, after dropping off pallet 310, backs away from pallet 310 and withdraws tines 302 and 304 therefrom. Namely, after transporting pallet 310 to its destination, vehicle 300 may lower tines 302 and 304 to the ground to place pallet 310 on the ground. Once pallet 310 is on the ground and before vehicle 300 begins to move tines 302 and 304, sensor 306 may perform a scan of pallet 310, generating an initial plurality of sensor data points. The initial plurality of sensor data points may be filtered using a region of interest situated about the face of the pallet (i.e., the side of the pallet closest to sensor 306). A first line, constituting the baseline geometric representation of the face of pallet 310, may be determined based on the filtered initial plurality of sensor data points.

Vehicle 300 may begin backing away to remove tines 302 and 304 from pallet 310 to disengage therefrom. As vehicle 300 is backing away, sensor 306 may generate subsequent pluralities of sensor data points, representing distances between sensor 306 and the face of pallet 310. The subsequent pluralities of sensor data points may be filtered using the region of interest, and subsequent lines, representing updated or subsequent geometric representations of the face of pallet 310, may be fitted to the subsequent pluralities of sensor data points. Each of the subsequent lines may be compared to the first line. If a line of the subsequent lines deviates from the first lines by more than the threshold value, motion of vehicle 300 may be modified, as this may indicate that pallet 310 is being dragged by vehicle 300 while vehicle 300 is backing away.

In some implementations, the operations described above may also be carried out after pallet 310 is picked up and while it is being moved through the environment to detect any unexpected shifting of pallet 310 relative to vehicle 300. In this case, however, the face of pallet 310 may be represented in a reference frame of sensor 306 since, during transport, pallet 310 is expected to remain stationary with respect to vehicle 300 but is expected to move with respect to the environment. The baseline and updated geometric representations may therefore be determined in the reference frame of vehicle 300 or sensor 306.

Figure 8:
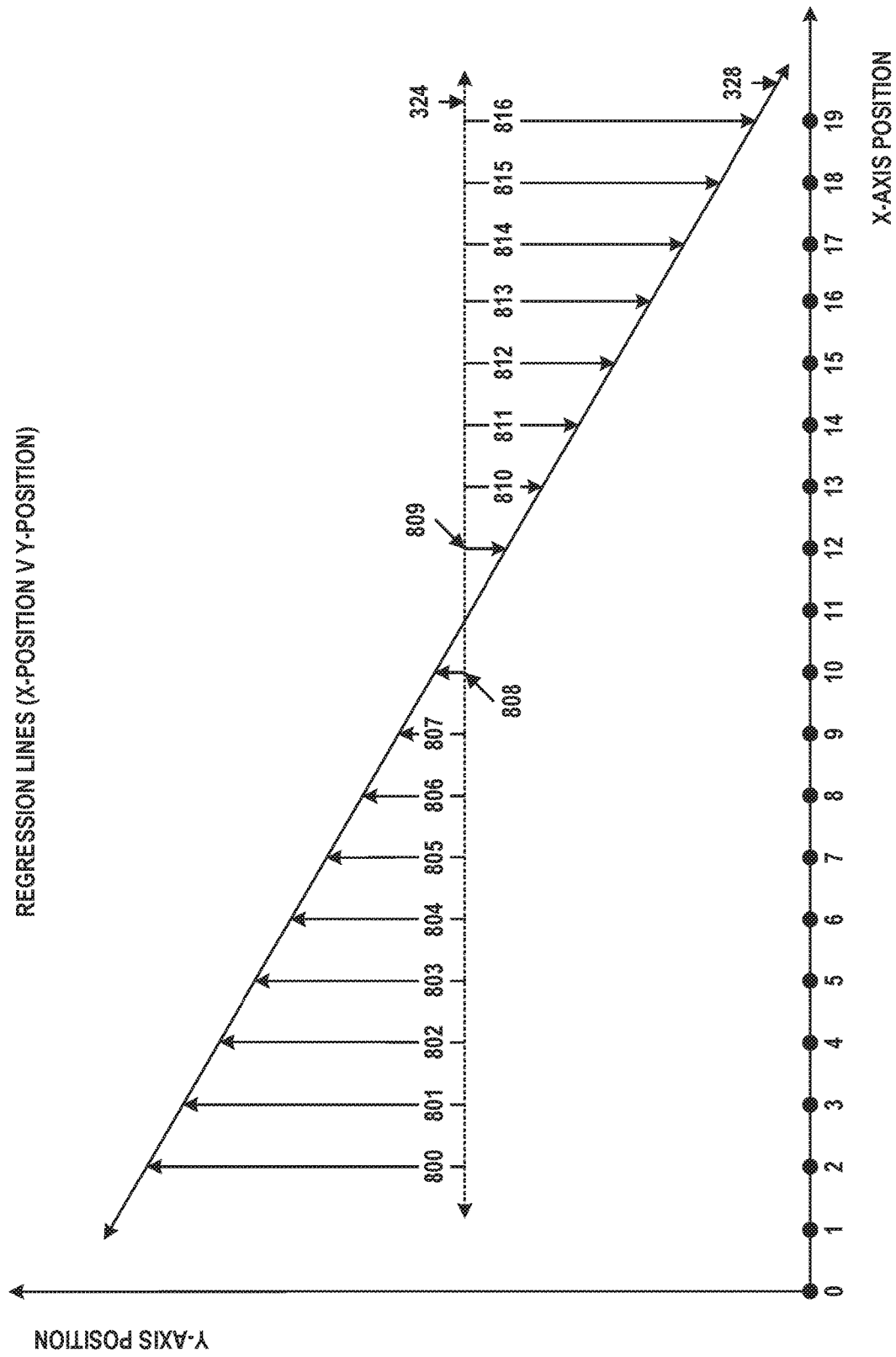
FIG. 8 illustrates differences between geometric representations, in accordance with example embodiments.

FIG. 8 illustrates an example comparison of lines 324 and 328 to determine whether they differ by more than the threshold value or extent. Lines 324 and 328 are shown graphed along an x-axis and a y-axis, which may correspond to shifted versions of reference frame 301. The control system may determine a plurality of residuals 800, 801, 802, 803, 804, 805, 806, 807, 808, 809, 810, 811, 812, 813, 814, 815, and 816 (i.e., residuals 800-816) corresponding to points 2-19 along the x-axis. Each residual may represent a difference between a y-value of line 324 at a particular x-position and a y-value of line 328 at the particular x-position.

The control system may determine that line 328 deviates from line 324 by more than the threshold extent or value based on residuals 800-816. In one example, the control system may determine that line 328 deviates from line 324 by more than the threshold value when at least one of residuals 800-816 exceeds the threshold value. In another example, the control system may determine that line 328 deviates from line 324 by more than the threshold value when a sum of absolute values of residuals 800-816 exceeds the threshold value. In a further example, the control system may determine that line 328 deviates from line 324 by more than the threshold value when a sum of squares of residuals 800-816 exceeds the threshold value. The threshold value may depend on how residuals 800-816 are used to determine the deviation of lines 324 and 328.

In some embodiments, the control system may also modify motion of vehicle 300 when a geometric representation, baseline or updated, cannot be determined. Such condition may arise, for example, when pallet 310 is pushed out of zone 322 by vehicle 300, and there is an insufficient number of data points to which a geometric representation cannot be fitted. In other embodiments, the control system may modify motion of vehicle 300 when a variance between the geometric representation, baseline or updated, and the underlying sensor data points based on which the geometric representation was determined exceeds a threshold variance value (i.e., when the underlying sensor data points are so scattered that they are not accurately represented by the geometric representation).

The operations described with respect to FIG. 3-8 have assumed that points along the face of pallet 310 are represented in 2D. This may be the case, for example, when sensor 306 generates distance data in 2D. Alternatively, when sensor 306 provides distance data in 3D, the face of pallet 310 may be represented in 2D by projecting the 3D sensor data points onto a single plane. However, the operations described with respect to FIGS. 7A-8 may also be extended to three dimensions.

VI. Example Pallet Tracking Using Geometric Fitting in 3D

Figure 9A:
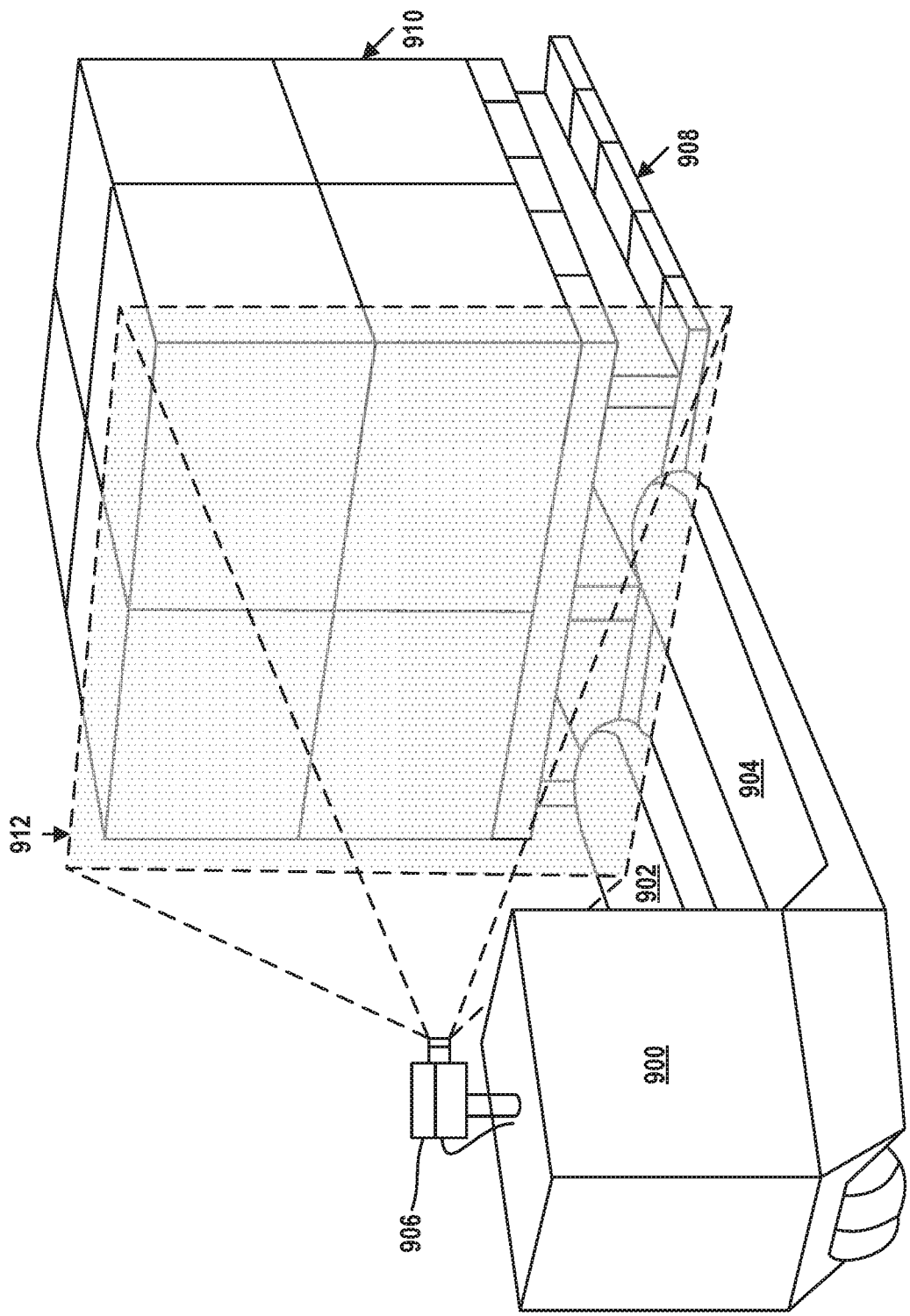
FIG. 9A illustrates a sensor scanning a pallet, in accordance with example embodiments.
Figure 9B:
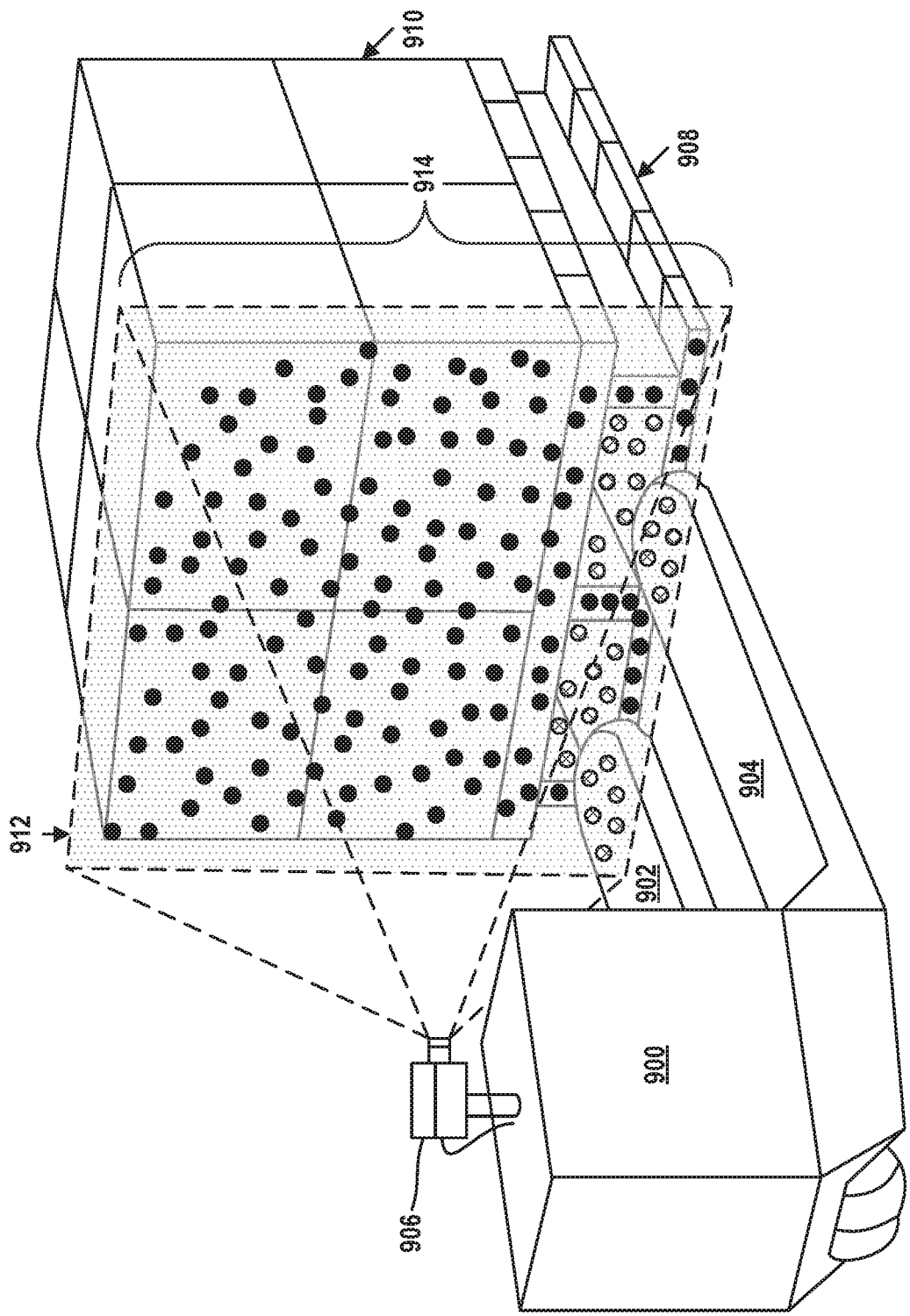
FIG. 9B illustrates a scan of a pallet, in accordance with example embodiments.

FIGS. 9A-9B illustrate vehicle 900 having tines 902 and 904, as well as sensor 906 connected thereto. Vehicle 900 may be configured to transport pallet 908, having load 910 thereon, within the environment. Vehicle 900 may be similar to vehicle 300 discussed with respect to FIGS. 7A-7E. Sensor 906 may be a 3D sensor configured to generate sensor data representing distances between sensor 906 and physical features within the environment. Sensor 906 may be a 3D LIDAR device, a ToF camera, or a stereo camera, among other possibilities. Sensor 906 may be repositionable with respect to vehicle 900 to scan different portions of the environment.

Vehicle 900 is shown scanning pallet 908 and load 910, as indicated by field of view 912, while vehicle 900 moves towards pallet 908 to penetrate pallet 908 with tines 902 and 904. However, before tines 902 and 904 penetrate pallet 908, sensor 906 may generate sensor data points 914 indicative of a plurality of distances between sensor 906 and different points along the front faces of pallet 908 and load 910, as illustrated in FIG. 9B.

A volume of interest (not shown) disposed about the face of pallet 908 and the face of load 910 may be used to filter out outlying data points that do not or are not likely to correspond to points along the faces of pallet 908 and load 910. Thus, a first subset of points 914, falling within the volume of interest and indicated as black circles, may be retained to be used to determine geometric representations of the face of pallet 908 and load 910, while a second subset of points 914, falling outside of the volume of interest and indicated as hatched circles, may be removed. Notably, the second subset of points includes points along tines 902 and 904, which are closer to vehicle 900 than the faces of pallet 908 and load 910, as well as points within the openings of pallet 908, which are farther away from vehicle 900 than the faces of pallet 908 and load 910.

The control system may fit a baseline plane (not shown) to the first subset of sensor data points 914, constituting the baseline geometric representation of the face of pallet 908 and load 910 thereon. When pallet 908 is not loaded with load 910, the baseline plane and any subsequently determined updated planes might be determined based on points which fall on pallet 908. In some instances, the face of load 910 and the face of pallet 908 might not be aligned (i.e., the face of load 910 might be farther forward or back on pallet 908 that the face of pallet 908). In such cases, the control system may determine a set of planes for each of the faces. That is, a first set of baseline and updated planes may be determined for the face of pallet 908, and a second set of baseline and updated planes may be determined for the face of load 910. Each set may be individually monitored for deviations.

As vehicle 900 continues moving towards pallet 908, and as tines 902 and 904 penetrate pallet 908, subsequent pluralities of sensor data (not shown) may be received from sensor 906, and may be filtered using the volume of interest. Based on the filtered subsequent pluralities of sensor data, the control system may determine updated geometric representations of the front faces of pallet 908 and load 910 in the form of updated planes fitted to the pluralities of sensor data. Each respective updated plane may be compared to the baseline plane to determine whether the respective updated plane deviates from the baseline plane by more than a threshold value or extent. This comparison may, for example, involve determining a plurality of residuals between the baseline plane and the updated plane. That is, the control system may determine whether the subsequent plane deviates or differs from the baseline plane by more than the threshold value using the operations described with respect to FIG. 8 in three dimensions instead of in two dimension.

While the updated planes do not deviate from the baseline plane by more than the threshold value, vehicle 900 may continue to move towards pallet 908 to penetrate pallet 908 with tines 902 and 904, and eventually pick up pallet 908. If, however, a respective updated plane does deviate from the baseline plane by more than the threshold value, motion of vehicle 900 may be modified to stop vehicle 900, break free any snags, or re-attempt another engagement of pallet 908. Similar operations may be carried out after vehicle 900 drops-off pallet 908 and backs away therefrom to withdraw tines 902 and 904 from the pallet openings (i.e., during pallet disengagement).

VII. Example Alternative Geometric Representations

In some embodiments, the baseline and updated geometric representations may take on forms other than a line or a plane. In one example, the geometric representation may be a center of mass (CoM) of the plurality of sensor data points. That is, the coordinates of each of the plurality of sensor data points may be averaged to determine a single point that represents the spatial average of the plurality of sensor data points. The CoM may be determine in either two or three dimensions, depending on the type of sensor data available. Motion of the vehicle may be modified when a position of the updated CoM differs from the baseline CoM by more than a threshold distance or value.

In some instances, the CoM may be a moving average (e.g., simple moving average, exponential moving average, etc.) of the plurality of successive sensor data points. That is, an updated CoM may be based on a weighted sum of a most recent plurality of sensor data points as well as past pluralities of sensor data points. In general, the geometric representations, including the lines and planes described above, may be determined to represent a moving average of the sensor data points. Determining the geometric representations using a moving average may further help mitigate the effects of outliers in the sensor data, thus reducing the likelihood of false positive detections of unplanned pallet motion.

VIII. Example Pallet Tracking Using Exclusion Fields

Figure 10A:
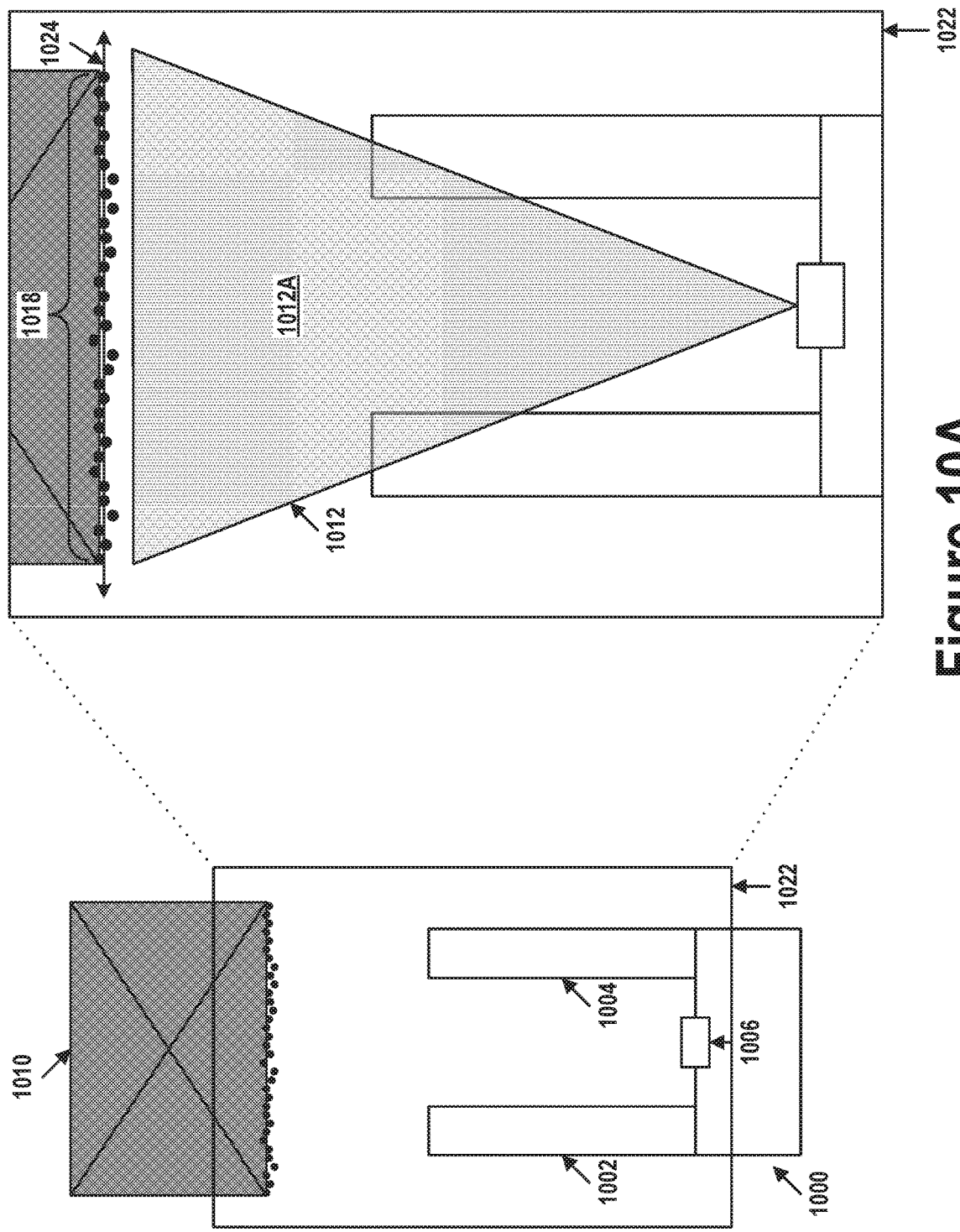
FIG. 10A illustrates an exclusion field, in accordance with example embodiments.
Figure 10B:
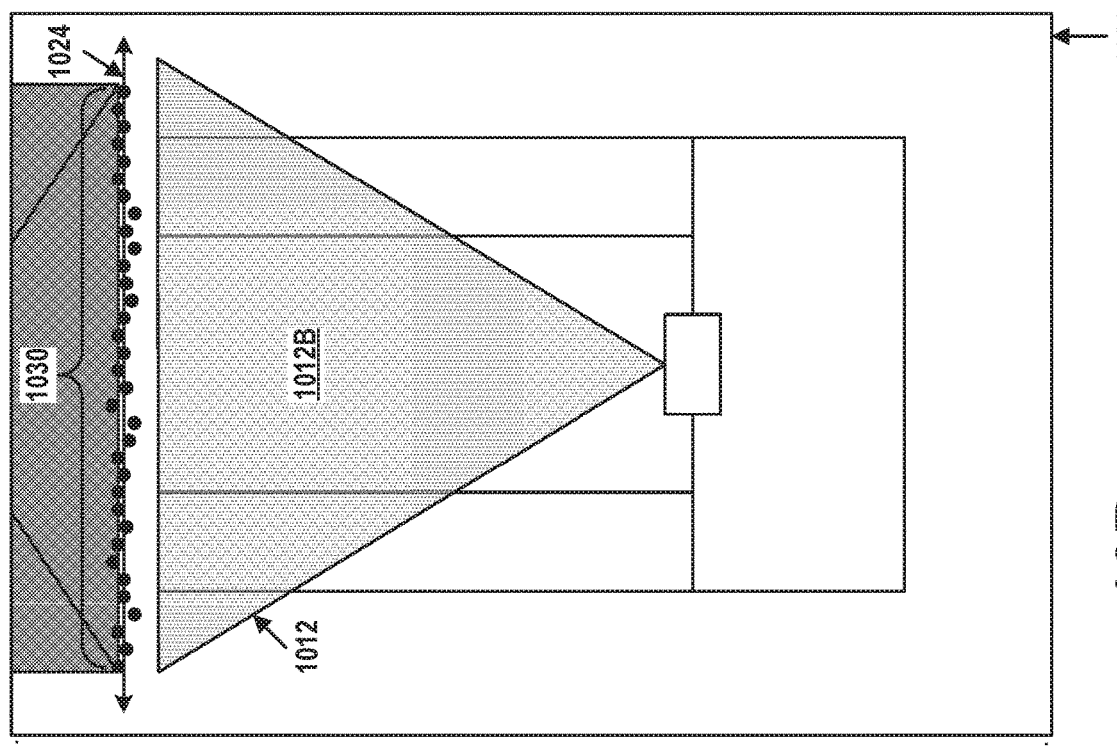
FIG. 10B illustrates an exclusion field, in accordance with example embodiments.
Figure 10B:
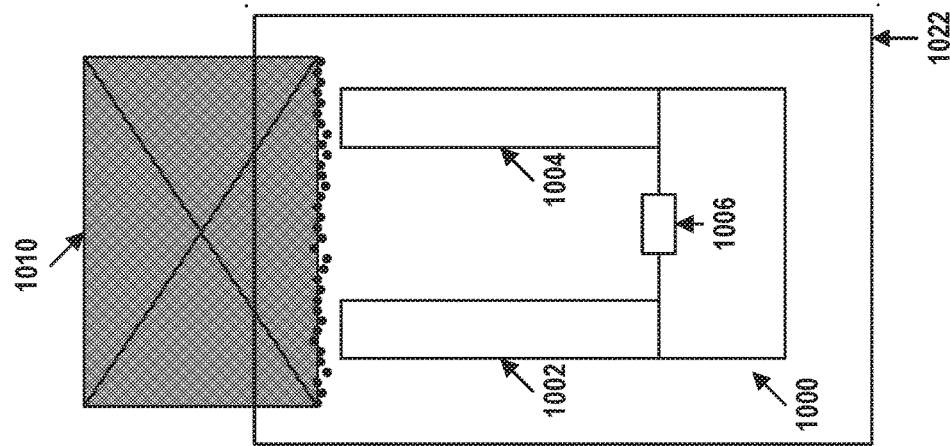
Figure 10C:
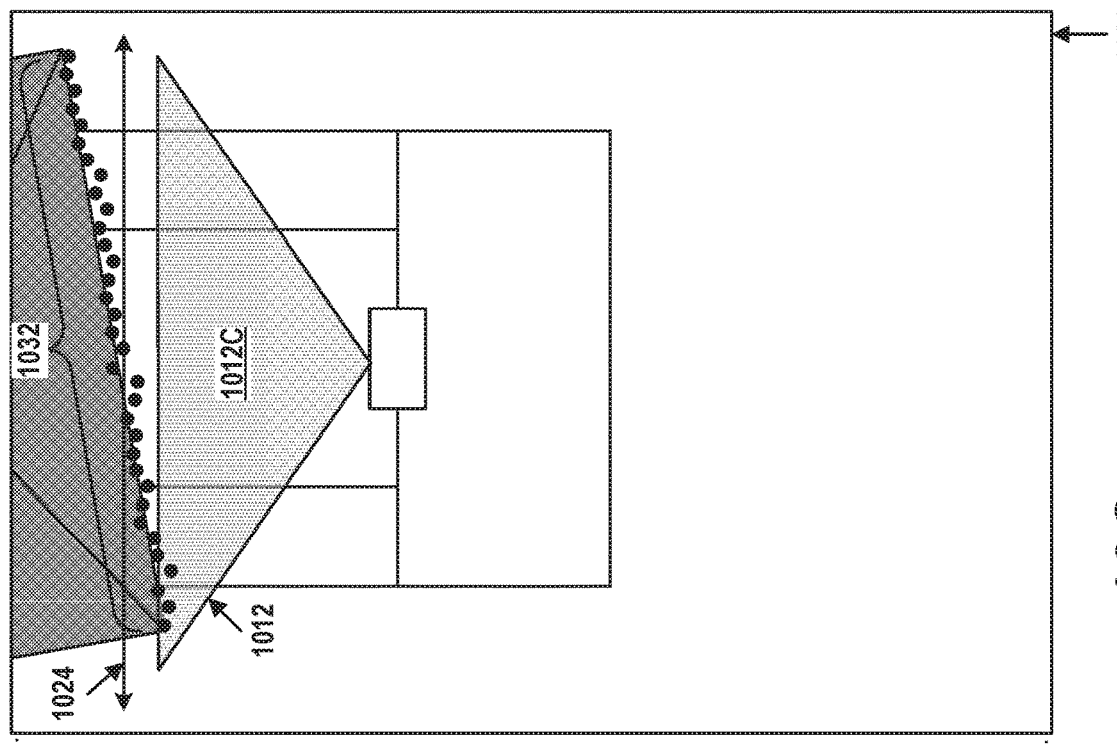
FIG. 10C illustrates an exclusion field, in accordance with example embodiments.
Figure 10C:
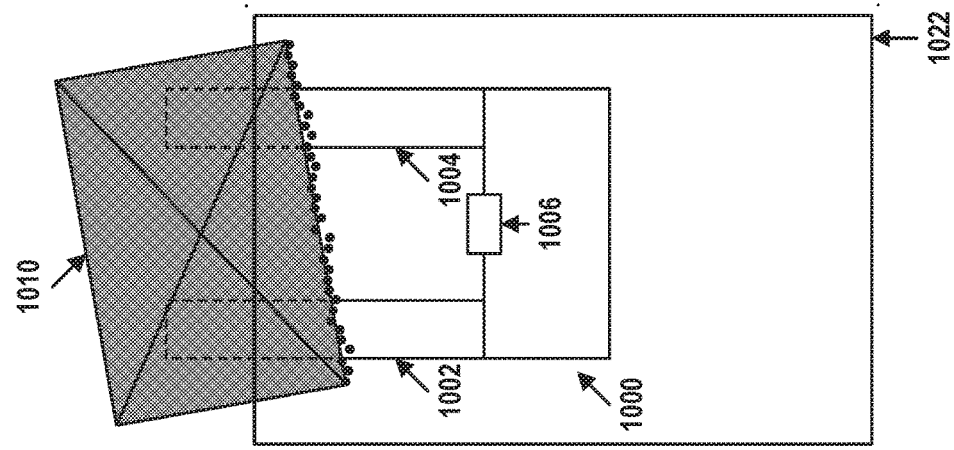

FIGS. 10A-10C illustrate an alternative approach for monitoring pallet pose during pallet engagement and disengagement. FIG. 10A illustrates a top-down view of vehicle 1000 having sensor 1006, as well as tines 1002 and 1004, operating within an environment to transport pallet 1010. Region 1022 of the environment is shown enlarged for clarity. As previously described with respect to FIGS. 7A-7E, sensor 1006 may be used to scan the environment and locate pallet 1010 therein. Before vehicle 1000 engages pallet 1010, sensor 1006 may generate an initial plurality of sensor data points 1018, representing a face of pallet 1010, and, in some cases, any load disposed thereon. A baseline geometric representation in the form of line 1024 may be fitted to sensor data points 1018.

The control system may determine exclusion field 1012, spanning area 1012A, between vehicle 1000 and line 1024 based on a distance between line 1024 and vehicle 1000. Exclusion field 1012 may be a region of space which is expected to be unoccupied by sensor data points (i.e., expected to be free of physical features). When a portion of pallet 1010, represented by sensor data points, enters exclusion field 1012, the control system may modify motion of vehicle 1000 and generate an error signal, much like in the case when the updated geometric representation deviates from the baseline geometric representation.

While exclusion field 1012 is free of obstacles, vehicle 1000 may proceed towards pallet 1010, as shown in FIG. 10B. Exclusion field 1012 may be considered free of obstacles when no more than a threshold number of sensor data points are found within exclusion field 1012. As vehicle 1000 gets closer to pallet 1010, the distance between vehicle 1000 and line 1024 may decrease, and exclusion field 1012 may be resized and updated based on the decreased distance. Thus, exclusion field 1012 may be decreased from having a size and shape defined by area 1012A to having a size and shape defined by area 1012B.

As vehicle 1000 gets closer to pallet 1010, the control system may receive subsequent sensor data points 1030 from sensor 1006. The control system may determine whether more than a threshold number of points of subsequent sensor data points 1030 are within exclusion field 1012 (i.e., within area 1012B). Since none of subsequent sensor data points 1030 are within exclusion field 1012, vehicle 1000 may proceed to move closer to pallet 1010 to engage it using tines 1002 and 1004.

In some instances, however, vehicle 1000 may inadvertently displace pallet 1010, as shown in FIG. 10C. FIG. 10C illustrates pallet 1010 inadvertently pushed and turned counterclockwise by tines 1002 and/or 1004 during engagement. The control system may receive, from sensor 1006, subsequent sensor data points 1032 after vehicle 1000 proceeds toward pallet 1010. Exclusion field 1012 may, based on the distance between vehicle 1000 and line 1024, be further resized to span area 1012C, which may be smaller than areas 1012A and 1012B.

The control system may determine that more than the threshold number of points of subsequent sensor data points 1032 are within exclusion field 1012 (i.e., the six leftmost points of sensor data points 1032 intersect with area 1012C). The threshold number of points may be, for example, 1, 2, 4, 10, 100, or 1000, among other possibilities, and may depend on properties of sensor 1006 (e.g., resolution, accuracy, etc.). For example, the threshold number of points may, for example, be based on a predetermined fraction of a total number of sensor data points received during a set period of time, for example (e.g., the threshold number may equal one tenth of the total number of sensor data points). In response to determining that more than the threshold number of points of subsequent sensor data points 1032 are within exclusion field 1012, the control system may modify motion of vehicle 1000.

In some implementations, the control system may, for each of subsequent sensor data points 1030 and 1032, determine a CoM. The control system may then determine whether the CoM is within exclusion field 1012. Motion of vehicle 1000 may be modified in response to the CoM intersecting with or being within exclusion field 1012.

Exclusion field 1012 may also be used to monitor pallet 1010 for inadvertent displacement as vehicle 1000 backs away from pallet 1010 during pallet disengagement. Notably, as vehicle 1000 backs away from pallet 1010, the size and area spanned by exclusion field 1012 may increase, rather than decreasing as in FIGS. 10A-10C. That is, exclusion field 1012 may start out having a size and shape defined by area 1012C, and subsequently increase to area 1010B and 1012A.

Further, although exclusion field 1012 is illustrated as spanning a two-dimensional area with the environment, the exclusion field may also be extended to three dimensions. That is, an exclusion field may define a volume of space between the baseline geometric representation and the vehicle, the volume of space expected to be unoccupied by sensor data points.

Figure 10D:
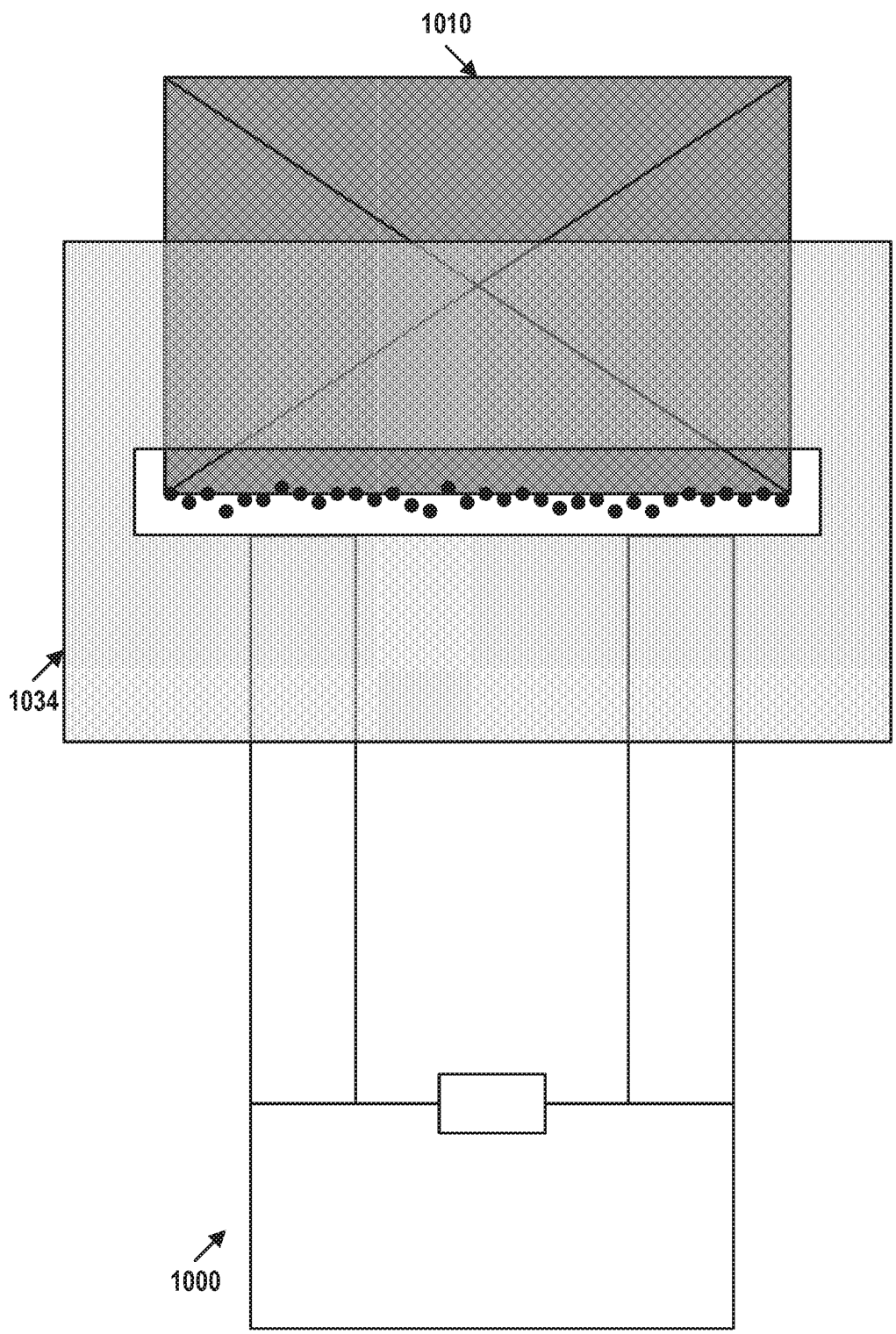
FIG. 10D illustrates an exclusion field, in accordance with example embodiments.

The exclusion field may take on different sizes and shapes, including regular geometric shapes as well as irregular shapes, in both two and three dimensions. FIG. 10D, for example, illustrates exclusion field 1034 which surrounds the face of pallet 1010. Unlike exclusion field 1012, which might not detect displacement of pallet 1010 when pallet 1010 is symmetrically pushed by both tines 1002 and 1004, exclusion field 1034 may detect both symmetric and asymmetric pallet displacements. In some embodiments, a plurality of different exclusion fields may be utilized, each having a different shape and/or size. The control system may determine the mode of pallet displacement (e.g., pulling, pushing, twisting) based on which of the plurality of different exclusion fields include therein more than the threshold number of sensor data points.

IX. Additional Example Operations

Figure 11:
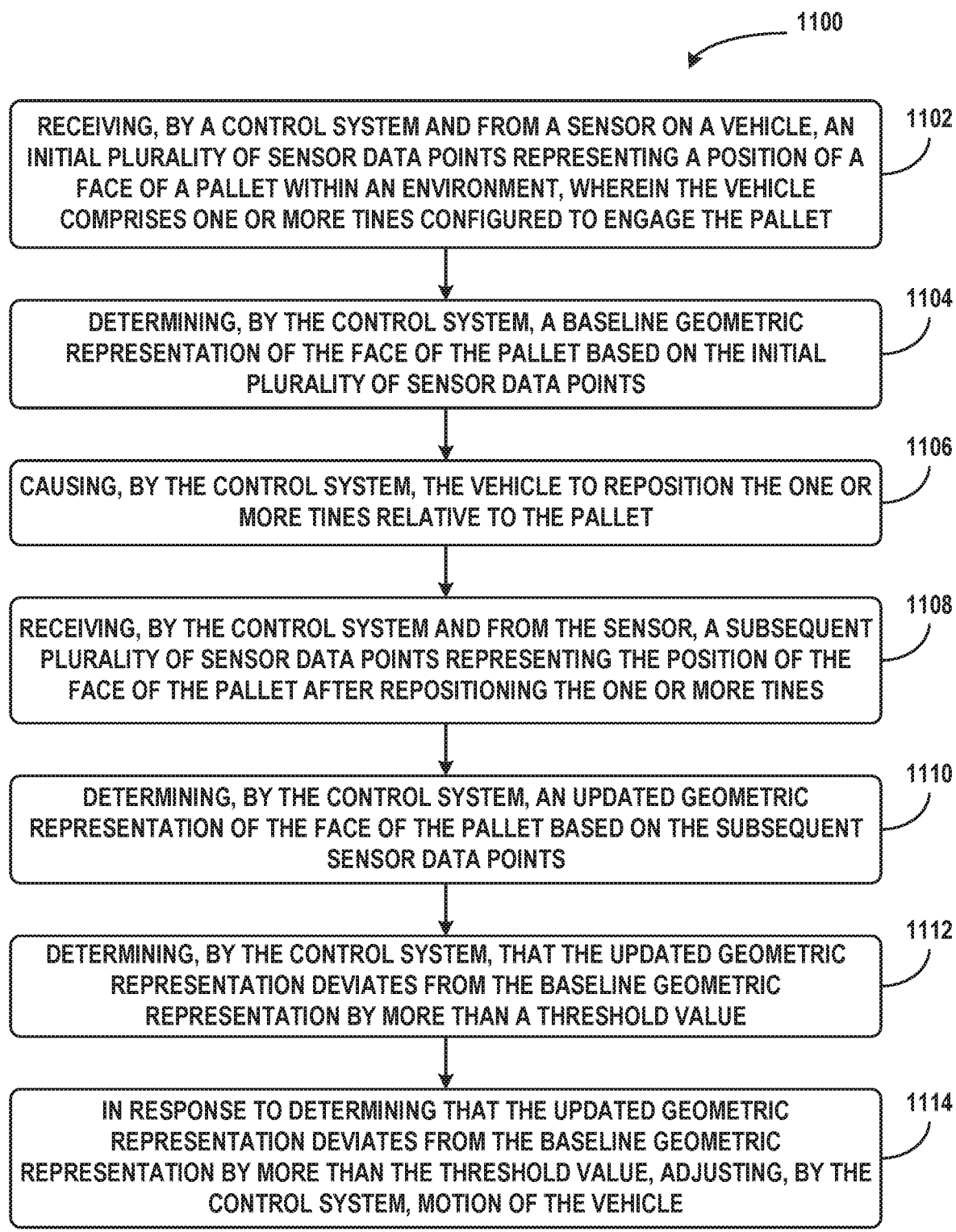
FIG. 11 illustrates a flow chart, in accordance with example embodiments.
Figure 12:
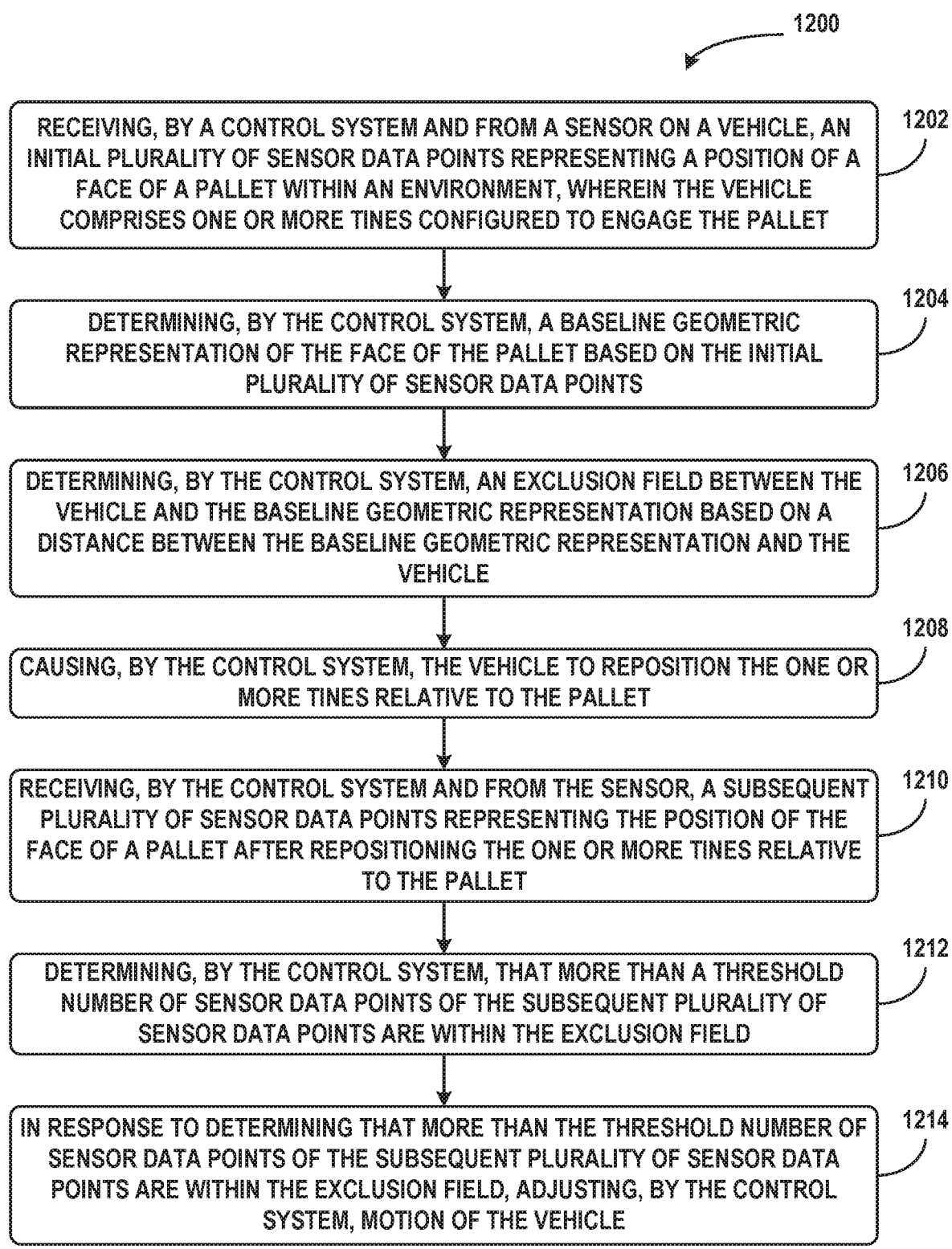
FIG. 12 illustrates a flow chart, in accordance with example embodiments.

FIGS. 11 and 12 illustrate flow chart 1100 and 1200, respectively, of example operations related to tracking of pallets during pallet pick-up and drop-off by, for example, fork truck 160. These operations may be executed by robotic system 100, computing device 200, computing clusters 209*a-c*, or one or more other computing devices or systems, which may, individually or collectively, constitute a control system. The operations of flow charts 1100 and 1200 may be performed in real time, and some or all of them may be repeated or updated periodically, for example, whenever updated sensor data becomes available (e.g., at a frequency of 50 Hz).

Block 1102 may involve receiving, by a control system and from a sensor on a vehicle, an initial plurality of sensor data points representing a position of a face of a pallet within an environment. The vehicle may include one or more tines configured to engage the pallet.

Block 1104 may involve determining, by the control system, a baseline geometric representation of the face of the pallet based on the initial plurality of sensor data points.

Block 1106 may involve causing, by the control system, the vehicle to reposition the one or more tines relative to the pallet.

Block 1108 may involve receiving, by the control system and from the sensor, a subsequent plurality of sensor data points representing the position of the face of the pallet after repositioning the one or more tines.

Block 1110 may involve determining, by the control system, an updated geometric representation of the face of the pallet based on the subsequent sensor data points.

Block 1112 may involve determining, by the control system, that the updated geometric representation deviates from the baseline geometric representation by more than a threshold value.

Block 1114 may involve, in response to determining that the updated geometric representation deviates from the baseline geometric representation by more than the threshold value, adjusting, by the control system, motion of the vehicle.

In some embodiments, the sensor data points may represent the position of the face of the pallet in at least two dimensions. The baseline geometric representation may include a first line fitted to the initial plurality of sensor data points, and the updated geometric representation may include a second line fitted to the subsequent plurality of sensor data points.

In some embodiments, the sensor data points may represent the position of the face of the pallet in three dimensions. The baseline geometric representation may include a first plane fitted to the initial plurality of sensor data points, and the updated geometric representation may include a second plane fitted to the subsequent plurality of sensor data points.

In some embodiments, the sensor data points may represent the position of the face of the pallet in at least two dimensions. The baseline geometric representation may include a first center of mass of the initial plurality of sensor data points, and the updated geometric representation may include a second center of mass of the subsequent plurality of sensor data points.

In some embodiments, the sensor data points may represent distances between the sensor and points along the face of the pallet. The position of the face of the pallet may be determined in a reference frame of the vehicle based on the distances between the sensor and the points along the face of the pallet. The position of the face of the pallet may be transformed from the reference frame of the vehicle to a reference frame of the environment based on a location of the vehicle within the environment.

In some embodiments, the sensor data points may additionally represent positions of other physical features within the environment. A zone of interest, occupied by the face of the pallet, may be determined within the environment. The initial plurality of sensor data points may be filtered by removing positions outside of the determined zone of interest. The baseline geometric representation may be determined based on the filtered initial plurality of sensor data points. The subsequent plurality of sensor data points may be filtered by removing positions outside of the determined zone of interest. The updated geometric representation may be determined based on the filtered subsequent plurality of sensor data points.

In some embodiments, determining that the updated geometric representation deviates from the baseline geometric representation by more than the threshold value may involve (i) determining a plurality of residuals indicating differences between positions along the face of the pallet represented by the updated geometric representation and positions along the face of the pallet represented by the baseline geometric representation, and (ii) determining that the plurality of determined residuals exceeds the threshold value.

In some embodiments, determining that the plurality of determined residuals exceeds the threshold value may involve determining (i) that one or more of the plurality of determined residuals exceed a first threshold value, (ii) that a sum of absolute values of the determined residuals exceeds a second threshold value, or (iii) that a sum of squares of the determined residuals exceeds a third threshold value.

In some embodiments, causing the vehicle to reposition the one or more tines relative to the pallet may involve causing the vehicle to drive towards the pallet to cause the one or more tines to penetrate the pallet while the pallet is disposed on a ground surface of the environment.

In some embodiments, causing the vehicle to reposition the one or more tines relative to the pallet may involve causing the vehicle to drive away from the pallet to remove the one or more tines from the pallet while the pallet is disposed on a ground surface of the environment.

In some embodiments, the face of the pallet may include a first vertical surface defined by a side of the pallet and a second vertical surface defined by a load disposed on the pallet.

In some embodiments, at least one of (i) a vertical position of the one or more tines or (ii) a tilt of the one or more tines, may be adjusted in response to determining that the updated geometric representation deviates from the baseline geometric representation by more than the threshold value.

In some embodiments, adjusting motion of the vehicle may involve stopping the vehicle. A warning indicating unexpected motion of the pallet may be generated in response to determining that the updated geometric representation deviates from the baseline geometric representation by more than the threshold value.

Turning now to FIG. 12, block 1202 may involve receiving, by a control system and from a sensor on a vehicle, an initial plurality of sensor data points representing a position of a face of a pallet within an environment, wherein the vehicle comprises one or more tines configured to engage the pallet.

Block 1204 may involve determining, by the control system, a baseline geometric representation of the face of the pallet based on the initial plurality of sensor data points.

Block 1206 may involve determining, by the control system, an exclusion field between the vehicle and the baseline geometric representation based on a distance between the baseline geometric representation and the vehicle.

Block 1208 may involve causing, by the control system, the vehicle to reposition the one or more tines relative to the pallet.

Block 1210 may involve receiving, by the control system and from the sensor, a subsequent plurality of sensor data points representing the position of the face of a pallet after repositioning the one or more tines relative to the pallet.

Block 1212 may involve determining, by the control system, that more than a threshold number of sensor data points of the subsequent plurality of sensor data points are within the exclusion field.

Block 1214 may involve in response to determining that more than the threshold number of sensor data points of the subsequent plurality of sensor data points are within the exclusion field, adjusting, by the control system, motion of the vehicle.

In some embodiments, causing the vehicle to reposition the one or more tines relative to the pallet may include causing the vehicle to drive away from the pallet to remove the one or more tines from the pallet while the pallet is disposed on a ground surface of the environment. A size of the exclusion field may be increased as the vehicle drives away from the pallet.

In some embodiments, causing the vehicle to reposition the one or more tines relative to the pallet may involve causing the vehicle to drive towards the pallet to cause the one or more tines to penetrate the pallet while the pallet is disposed on a ground surface of the environment. A size of the exclusion field may be decreased as the vehicle drives towards the pallet.

In some embodiments, the sensor data points may represent the position of the face of the pallet in at least two dimensions. The baseline geometric representation may involve a first line fitted to the initial plurality of sensor data points, and the exclusion field may include an area between the first line and the vehicle.

In some embodiments, the sensor data points may represent the position of the face of the pallet in three dimensions. The baseline geometric representation may include a first plane fitted to the initial plurality of sensor data points, and the exclusion field may include a volume between the first plane and the vehicle.

In some embodiments, the sensor data points may additionally represent positions of other physical features within the environment. A zone of interest, occupied by the face of the pallet, may be determined within the environment. The initial plurality of sensor data points may be filtered by removing positions outside of the determined zone of interest. The baseline geometric representation may be determined based on the filtered initial plurality of sensor data points.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A non-transitory computer-readable storage medium having stored thereon instructions that, when executed by a computing device, cause the computing device to perform operations comprising:
    receiving, from a sensor on a robotic device, an initial plurality of sensor data points representing a position of a face of an object within an environment, wherein the robotic device comprises an actuated mechanical component configured to engage the object;
    determining a baseline geometric representation of the face of the object based on the initial plurality of sensor data points;
    causing the robotic device to reposition the actuated mechanical component relative to the object;
    receiving, from the sensor, a subsequent plurality of sensor data points representing the position of the face of the object after repositioning the actuated mechanical component;
    determining an updated geometric representation of the face of the object based on the subsequent plurality of sensor data points;
    determining that the updated geometric representation deviates from the baseline geometric representation by more than a threshold value; and
    based on determining that the updated geometric representation deviates from the baseline geometric representation by more than the threshold value, adjusting motion of one or more of the robotic device or the actuated mechanical component.

2. The non-transitory computer-readable storage medium of claim 1, wherein the sensor data points represent the position of the face of the object in at least two dimensions, wherein the baseline geometric representation comprises a first line fitted to the initial plurality of sensor data points, and wherein the updated geometric representation comprises a second line fitted to the subsequent plurality of sensor data points.

3. The non-transitory computer-readable storage medium of claim 1, wherein the sensor data points represent the position of the face of the object in three dimensions, wherein the baseline geometric representation comprises a first plane fitted to the initial plurality of sensor data points, and wherein the updated geometric representation comprises a second plane fitted to the subsequent plurality of sensor data points.

4. The non-transitory computer-readable storage medium of claim 1, wherein the sensor data points represent the position of the face of the object in at least two dimensions, wherein the baseline geometric representation comprises a first center of mass of the initial plurality of sensor data points, and wherein the updated geometric representation comprises a second center of mass of the subsequent plurality of sensor data points.

5. The non-transitory computer-readable storage medium of claim 1, wherein the sensor data points additionally represent positions of other physical features within the environment, and wherein the operations further comprise:
    determining a zone of interest within the environment occupied by the face of the object;
    filtering the initial plurality of sensor data points by removing positions outside of the determined zone of interest;
    determining the baseline geometric representation based on the filtered initial plurality of sensor data points;
    filtering the subsequent plurality of sensor data points by removing positions outside of the determined zone of interest; and
    determining the updated geometric representation based on the filtered subsequent plurality of sensor data points.

6. The non-transitory computer-readable storage medium of claim 1, wherein determining that the updated geometric representation deviates from the baseline geometric representation by more than the threshold value comprises:
    determining a plurality of residuals indicating differences between positions along the face of the object represented by the updated geometric representation and positions along the face of the object represented by the baseline geometric representation; and
    determining that the plurality of residuals exceeds the threshold value.

7. The non-transitory computer-readable storage medium of claim 6, wherein determining that the plurality of residuals exceeds the threshold value comprises:
    determining (i) that one or more of the plurality of residuals exceed a first threshold value, (ii) that a sum of absolute values of the residuals exceeds a second threshold value, or (iii) that a sum of squares of the residuals exceeds a third threshold value.

8. The non-transitory computer-readable storage medium of claim 1, wherein causing the robotic device to reposition the actuated mechanical component relative to the object comprises:
    causing the robotic device to move at least one of the robotic device or the actuated mechanical component towards the object to cause the actuated mechanical component to engage the object.

9. The non-transitory computer-readable storage medium of claim 1, wherein causing the robotic device to reposition the actuated mechanical component relative to the object comprises:

causing the robotic device to move at least one of the robotic device or the actuated mechanical component away from the object to cause the actuated mechanical component to disengage from the object.

10. A non-transitory computer-readable storage medium having stored thereon instructions that, when executed by a computing device, cause the computing device to perform operations comprising:

receiving, from a sensor on a robotic device, an initial plurality of sensor data points representing a position of a face of an object within an environment, wherein the robotic device comprises an actuated mechanical component configured to engage the object;

determining a baseline geometric representation of the face of the object based on the initial plurality of sensor data points;

determining an exclusion field comprising a region between the robotic device and the baseline geometric representation based on the baseline geometric representation;

causing the robotic device to reposition the actuated mechanical component relative to the object;

receiving, from the sensor, a subsequent plurality of sensor data points representing the position of the face of the object after repositioning the actuated mechanical component relative to the object;

determining that more than a threshold number of sensor data points of the subsequent plurality of sensor data points are within the exclusion field; and based on determining that more than the threshold number of sensor data points of the subsequent plurality of sensor data points are within the exclusion field, adjusting motion of one or more of the robotic device or the actuated mechanical component.

11. The non-transitory computer-readable storage medium of claim 10, wherein the exclusion field surrounds the baseline geometric representation.

12. The non-transitory computer-readable storage medium of claim 10, wherein causing the robotic device to reposition the actuated mechanical component relative to the object comprises causing at least one of the robotic device or the actuated mechanical component to move away from the object to disengage from the object, and wherein the operations further comprise:

increasing a size of the exclusion field as the at least one of the robotic device or the actuated mechanical component moves away from the object.

13. The non-transitory computer-readable storage medium of claim 10, wherein causing the robotic device to reposition the actuated mechanical component relative to the object comprises causing at least one of the robotic device or the actuated mechanical component to move towards the object to engage with the object, and wherein the operations further comprise:

decreasing a size of the exclusion field as the at least one of the robotic device or the actuated mechanical component moves towards the object.

14. The non-transitory computer-readable storage medium of claim 10, wherein the sensor data points represent the position of the face of the object in at least two dimensions, wherein the baseline geometric representation comprises a first line fitted to the initial plurality of sensor data points, and wherein the region comprises an area between the first line and the robotic device.

15. The non-transitory computer-readable storage medium of claim 10, wherein the sensor data points represent the position of the face of the object in three dimensions, wherein the baseline geometric representation comprises a first plane fitted to the initial plurality of sensor data points, and wherein the region comprises a volume between the first plane and the robotic device.

16. The non-transitory computer-readable storage medium of claim 10, wherein the sensor data points additionally represent positions of other physical features within the environment, and wherein the operations further comprise:

determining a zone of interest within the environment occupied by the face of the object;

filtering the initial plurality of sensor data points by removing positions outside of the determined zone of interest; and determining the baseline geometric representation based on the filtered initial plurality of sensor data points.

17. The non-transitory computer-readable storage medium of claim 10, wherein the face of the object comprises a first vertical surface defined by a side of the object and a second vertical surface defined by platform on which the object is disposed.

18. The non-transitory computer-readable storage medium of claim 10, wherein adjusting motion of the one or more of the robotic device or the actuated mechanical component comprises stopping the robotic device and the actuated mechanical component, and wherein the operations further comprise:

in response to determining that more than the threshold number of sensor data points of the subsequent plurality of sensor data points are within the exclusion field, generating a warning indicating unexpected motion of the object.

19. A system comprising:

a robotic device comprising an actuated mechanical component configured to engage objects;

a sensor connected to the robotic device; and a control system configured to perform operation comprising:

receiving, from the sensor, an initial plurality of sensor data points representing a position of a face of an object within an environment;

determining a baseline geometric representation of the face of the object based on the initial plurality of sensor data points;

determining an exclusion field comprising a region between the robotic device and the baseline geometric representation based on the baseline geometric representation;

causing the robotic device to reposition the actuated mechanical component relative to the object;

receiving, from the sensor, a subsequent plurality of sensor data points representing the position of the face of the object after repositioning the actuated mechanical component relative to the object;

determining that more than a threshold number of sensor data points of the subsequent plurality of sensor data points are within the exclusion field; and based on determining that more than the threshold number of sensor data points of the subsequent plurality of sensor data points are within the exclusion field, adjusting motion of one or more of the robotic device or the actuated mechanical component.

20. The system of claim 19, wherein the exclusion field surrounds the baseline geometric representation.

* * * * *